United States Patent [19]
Ikeda

[11] Patent Number: 5,978,553
[45] Date of Patent: Nov. 2, 1999

[54] SYSTEM FOR PROCESSING RECEIVED PRINT DATA PRIOR TO PRINTING

[75] Inventor: Jun Ikeda, Yokohama, Japan

[73] Assignee: Canon Kabushiki Kaisha, Tokyo, Japan

[21] Appl. No.: 08/780,617

[22] Filed: Jan. 8, 1997

[30] Foreign Application Priority Data

Jan. 16, 1996 [JP] Japan ................................. 8-004840

[51] Int. Cl.⁶ ........................... G06K 15/02; H04N 1/50; H04N 1/60; H04N 1/21
[52] U.S. Cl. ......................... 395/109; 395/112; 395/115; 358/518; 358/524
[58] Field of Search .................................. 395/109, 115, 395/112; 358/518, 524, 530

[56] References Cited

U.S. PATENT DOCUMENTS 4,642,680 2/1987 Yamada ................................. 358/524
5,136,688 8/1992 Morikawa et al. ..................... 395/115

*Primary Examiner*—Scott Rogers
*Attorney, Agent, or Firm*—Fitzpatrick, Cella, Harper & Scinto

[57] ABSTRACT

When print data is received from a host computer, a rendering/compression/expansion unit generates image data in a unit of a band, then a specified logical operation is performed on the image data in the band unit and the resultant image data is compressed to be stored. When the image data corresponding to one page of an original image is stored, the image data is expanded and printed by a printer. Since the generation of image data and logical operation are performed in the band unit, the memory capacity required for the processing is small. Also, since the image data is compressed after the above process, the memory capacity required for storing is small. By virtue of this, resolution or tone of an original image does not have to be decreased depending on a memory capacity.

50 Claims, 25 Drawing Sheets

ADDITIVE MIXTURE OF COLOR STIMULI R,G,B

R : RED
G : GREEN
B : BLUE
W : WHITE
Y : YELLOW
M : MAGENTA
C : CYAN
K : BLACK

SUBTRACTIVE MIXTURE OF COLOR STIMULI Y,M,C,K

R : RED
G : GREEN
B : BLUE
W : WHITE
Y : YELLOW
M : MAGENTA
C : CYAN
K : BLACK

EXAMPLE OF RENDERING WHERE OVERLAPPED PORTION (OBJECT)
IS OVERWRITTEN BY A PREDETERMINED COLOR

EXAMPLE OF RENDERING OPERATION
FOR CALCULATING OVERLAPPED COLORS

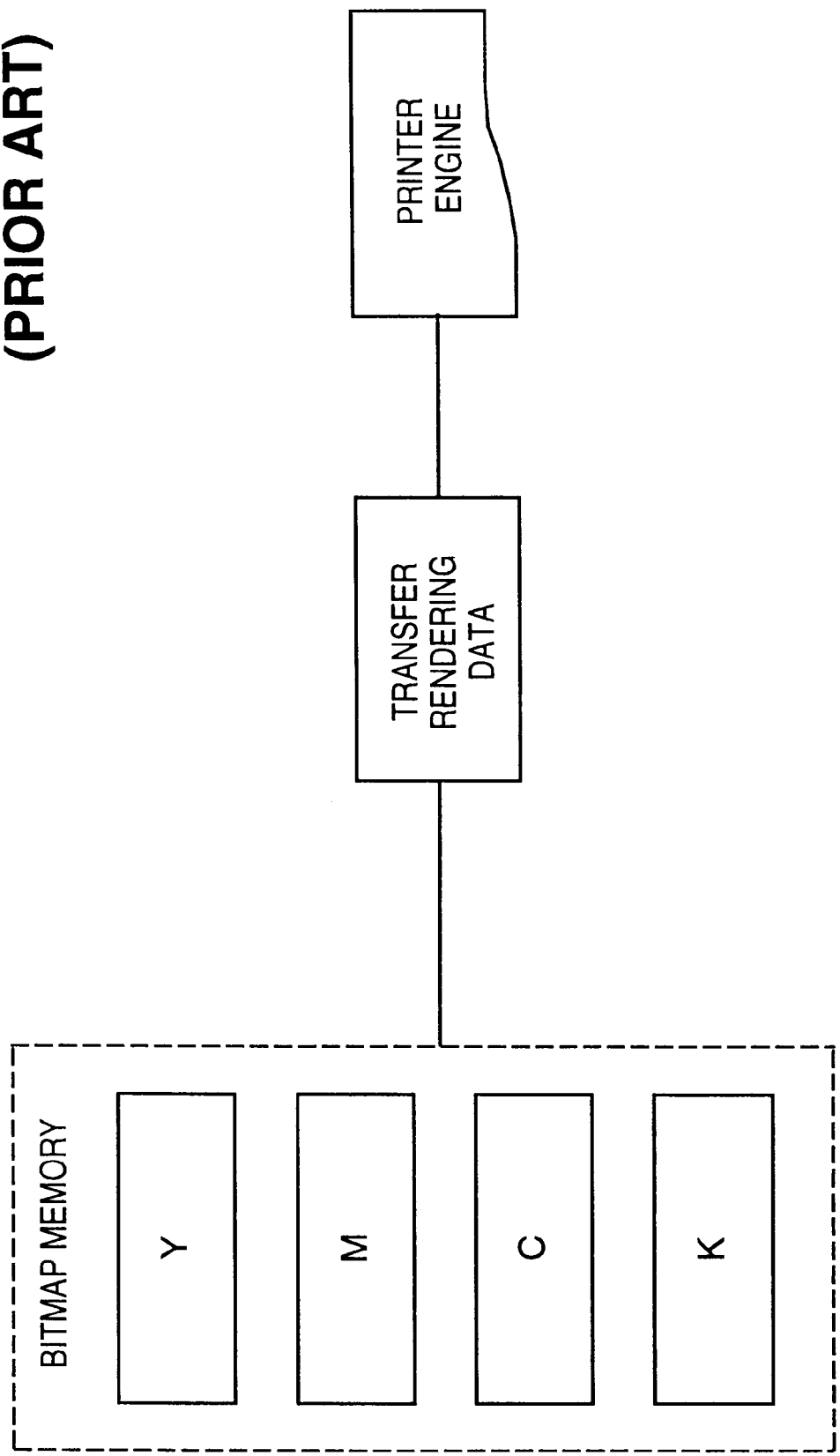

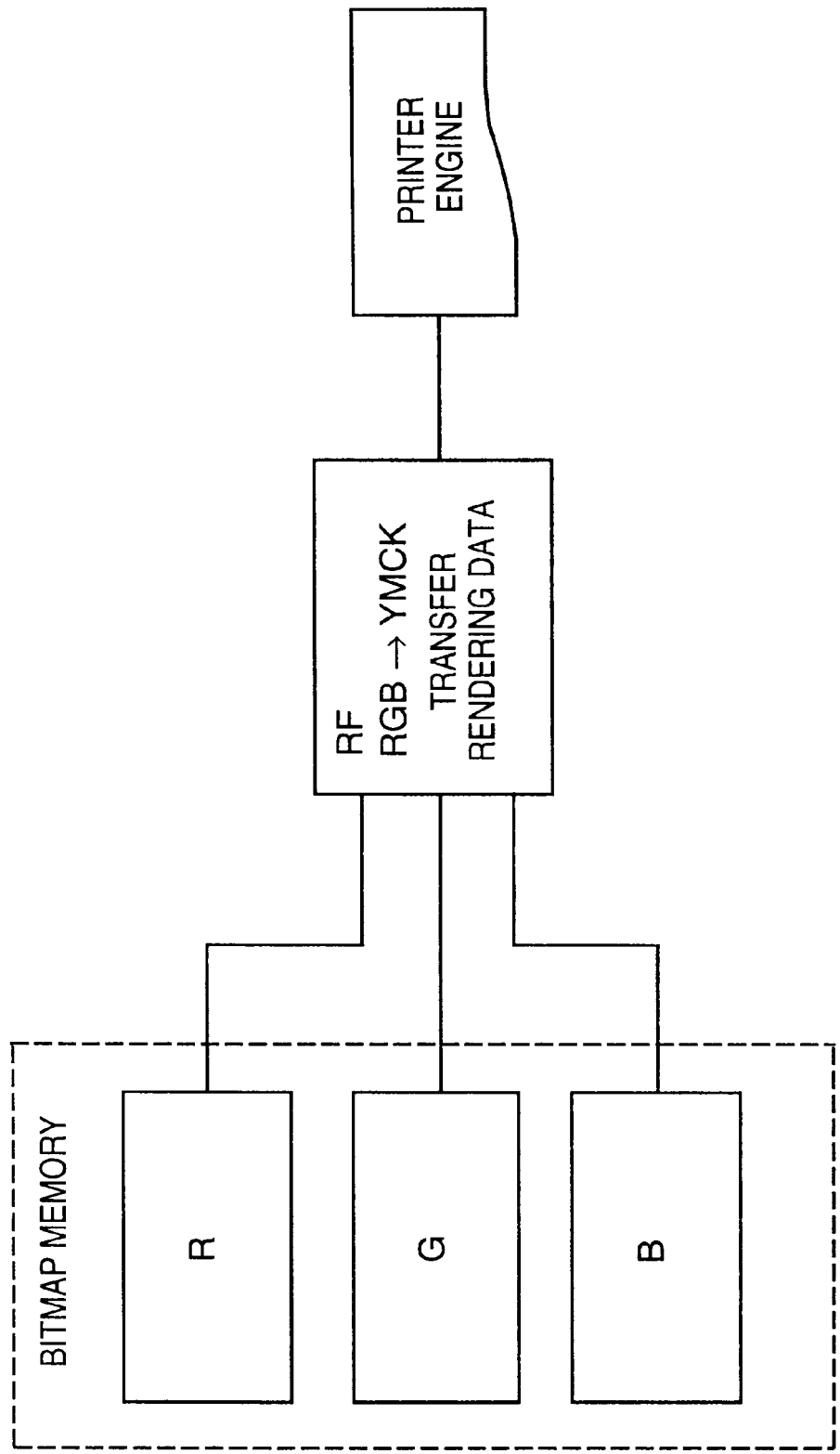

SYSTEM FOR PROCESSING RECEIVED PRINT DATA PRIOR TO PRINTING

BACKGROUND OF THE INVENTION

Present invention relates to a color printing apparatus for receiving image data from a data supplying source such as a host computer or the like and performing logical operation on the received data to print out a color image.

Generally, a system including a printer and a document processing apparatus e.g. document generating system or the like, is configured as shown in FIG. 21. The system is constituted by a host computer 101 which performs processing e.g. image forming or the like on data to be outputted, and a printer 102 which prints the data to be outputted processed by the host computer on a printing medium e.g. a print sheet, connected to the host computer 101. In the system, a user edits an image to be outputted by the host computer 101. When a user completes editing operation of the image to be outputted, the image data is converted to outputting data processable by the printer 102, and sent to the printer 102. The printer 102 prints a sheet according to the received data.

In order to express a color image on a display 1011 which is included in the host computer 101, the color image data in the host computer is expressed by additive mixture of color stimuli: R, G and B (FIG. 22A), because of the characteristics of the display. However, the printer 102 expresses data by subtractive mixture of color stimuli: Y, M, C and K (FIG. 22B).

Accordingly, when printing operation is to be performed, it is necessary to perform conversion from R, G and B to Y, M, C and K either in the host computer 101 or in the printer 102 utilizing some type of method. Since the method of conversion is already known to those who are skilled in the art, detailed descriptions will not be provided herein.

Further, in order to output a color image having an image area where plural colors overlap each other, it is necessary to perform logical operation for, e.g. mixing colors of the overlapped areas of an object or the like. Recently-available operating system (OS) for the host computer 101 includes a functional operation (hereinafter referred to as "rendering operation") for calculating colors of such image objects. In a system not having a rendering operation function, an image of three circles respectively colored by R, G and B as shown in FIG. 23A has to be printed in accordance with a predetermined rendering operation procedure, such as overwriting.

Lately, a host computer OS which includes the function of rendering operation is available for calculating colors of an image area where objects (circles) respectively colored by Y, M and C overlap on top of each other as shown in FIG. 23B. In a system including such OS, an application software operated on the host computer informs of a rendering operation procedure for calculating the overlapped colors to e.g. a display manager or the like in the OS, thereby realizing rendering operation for mixing overlapped colors or the like. The application software does not need to perform the rendering operation itself, or is not influenced by the result of the rendering operation. More specifically, when rendering of an image as shown in FIG. 23B is to be performed, the application software operating on the host computer which supports the rendering operation only needs to instruct the OS of the host computer to render each of the objects (circles) colored by Y, M and C, and designates a rendering operation procedure. If the same image (circles) is to be rendered by an OS which does not support the rendering operation, the overlapped area where plural objects overlap on top of each other needs to be first extracted with respect to each of Y, M and C by an application software or a printer driver, then the color of the extracted area to be outputted is determined by a rendering operation, and the overlapped area must be overwritten by a color determined by the rendering operation.

However, even if the OS on the host computer supports the rendering operation for calculating overlapped colors for displaying, a connected printer must also support such rendering operation for calculating the overlapped colors. Otherwise, it is necessary for an application software in the host computer or the printer driver to perform processing similar to that of a host computer which does not have an OS to support the rendering operation, to perform printing.

Moreover, in the rendering operation, a user normally generates an image to be outputted on a display on the host computer, thus the rendering operation procedure is designated on the basis of R, G and B data. Therefore, a rendering operation must also be performed at the printer side to calculate pixels expressed in R, G and B. In other words, printers, in most cases, cannot perform the rendering operation on Y, M, C and K data (where conversion processing of RGB→YMCK has been performed). This is due to the fact that the capacity of a memory source is quite limited for a built-in apparatus which does not include a virtual memory. Therefore, in most cases, tone or resolution of an image is decreased at the time of the conversion processing of RGB→YMCK performed by the host computer. In such case, the conversion processing is irreversible. Thus, the Y, M, C and K data received by the printer does not accurately corresponds to R, G and B data sent by the host computer; in other words, the printer cannot accurately reproduce data obtained by the rendering operation performed by the host computer, causing difficulty in supporting the rendering operation.

Color data processing performed by a color printer can be roughly classified into a case where processing is performed on Y, M, C and K data (FIG. 24), and a case where processing is performed on R, G and B data, then converted to Y, M, C and K data (FIG. 25). In the former case, there is a problem as described above in that the rendering operation is difficult to perform. In the latter case, if storage for storing R, G and B data consists of 1 memory bank, each color data of one pixel for Y, M, C and K is generated by a corresponding pixel of R, G and B data. Therefore, a transmission rate through a bus requires three times the rate of transmission for outputting the processing color (Y, M, C and K). If the required transmission rate from the memory storing rendering data (R, G and B) to a printer engine cannot be secured, a problem arises in that the tone or resolution of the image must be decreased.

When a printer apparatus is configured according to the diagram shown in FIG. 25, the printer realizes a decreased tone and resolution due to the above problem of a transmission rate through a bus. However, a print request from a user does not always require a rendering operation for calculating overlapped colors. In the apparatus such as that shown in FIG. 25, even when data not requiring a rendering operation is inputted, the tone or resolution, which could be outputted if processed by the apparatus configured as shown in FIG. 24, is unconditionally decreased.

Moreover, when a color printer which supports a rendering operation is to be realized, a memory thereof must have enough capacity to store each of R, G and B data corresponding to at least one page of data. Therefore, as resolution or tone of an output image increases, the memory capacity for storing the image data increases. Accordingly, in a case of a currently-available printer having a resolution of 600 dpi or a printer capable of expressing multiple tones, the memory required cost is high.

SUMMARY OF THE INVENTION

The present invention has been made in consideration of the above conventional example, and the object of the invention is to provide a printing apparatus and control method thereof which realizes a rendering operation for calculating overlapped colors using a small memory capacity, and realizes printout of an original image without decreasing the tone or resolution of the original image.

In order to attain the above object, the present invention provides a printing apparatus comprising: reception means for receiving color print data; mode-designation means for designating a mode in accordance with the color print data received by the reception means; development means for developing color image data and dividing the color image data into color component data in accordance with the color print data received by the reception means; storage means for storing the color component data developed by the development means; operation means for performing operation processing on the color component data stored by the storage means and the color image data developed by the development means, in accordance with an operation procedure corresponding to the mode, and output means for outputting color image operated by the operation means.

Furthermore, in order to attain the above object, the present invention provides a color printing apparatus comprising: an interface for receiving print data from a print-data generation source such as a host computer or the like; image generation means for generating image data by analyzing the print data received by the interface; a memory for temporarily storing the image data generated by the image generation means; operation means for performing rendering operation on the image data stored in the memory and the image data generated by the image generation means; compression means for compressing the image data stored in the memory; a second memory for storing the data compressed by the compression means for at least one page of an original image; expansion means for expanding the compressed data stored in the second memory; a printer engine for printing the image data expanded by the expansion means on a printing medium; and control means for controlling each of the aforementioned means, wherein image data is generated by the image generation means in a unit of a band where one page of an original image is divided into areas of a predetermined size, rendering operation is performed by the operation means on the image data to render the image data in the band unit, and the band image data is compressed by the compression means, the image data generation, the rendering operation and the compression processing being repeated until compressed data corresponding to one page of the original image is stored, and each of the means being synchronously operated; and wherein the printer engine is started when the data corresponding to one page of the original image is stored in the second memory, the compressed data is expanded by the expansion means in real-time in synchronization with a printing speed, resulting in an image being outputted by the printer engine.

Moreover, in order to attain the above object, the present invention provides a printing control method utilizing a band storage which stores color image data, comprising the steps of: receiving color print data; developing color image data and dividing the color image data into color component data in accordance with the color print data received in the receiving step; designating a mode in accordance with the color print data received in the receiving step; performing operation processing on the color component data stored in the storage and the color image data developed in the developing step, in accordance with an operation procedure corresponding to the mode, and storing the result of the operation in the storage; and outputting the color image operated in the operating step.

Moreover, in order to attain the above object, the present invention provides a printing control method for controlling a color printing apparatus which includes: an interface for receiving print data from a print-data generation source such as a host computer or the like; image generation means for generating image data by analyzing the print data received by the interface; a memory for temporarily storing the image data generated by the image generation means; operation means for performing rendering operation on the image data stored in the memory and the image data generated by the image generation means; compression means for compressing the image data stored in the memory; a second memory for storing the data compressed by the compression means for at least one page of an original image; expansion means for expanding the compressed data stored in the second memory; a printer engine for printing the image data expanded by the expansion means on a printing medium; and control means for controlling each of the aforementioned means, the printing control method comprising the steps of: generating image data by the image generation means in a unit of a band where one page of an original image is divided into areas of a predetermined size, performing rendering operation by the operation means on the image data to render the image data in the band unit, and compressing the band image data by the compression means, the image data generation step, the rendering operation step and the compression processing step being repeated until compressed data corresponding to one page of the original image is stored, and each of the means being synchronously operated; and wherein the printer engine is started when the data corresponding to one page of the original image is stored in the second memory, the compressed data is expanded by the expansion means in real-time in synchronization with a printing speed, resulting in an image being outputted by the printer engine.

Still further, in order to attain the above object, the present invention provides a computer program product comprising a computer readable medium having computer program codes, for outputting received print data as an image, the program including the steps of: receiving color print data; developing color image data and dividing the color image data into color component data in accordance with the color print data received in the receiving step; designating a mode in accordance with the color print data received in the receiving step; performing operation processing on the color component data stored in the storage and the color image data developed in the developing step, in accordance with an operation procedure corresponding to the mode, and storing the result of the operation in the storage; and outputting the color image operated in the operating step.

Still further, in order to attain the above object, the present invention provides a computer program product comprising a computer readable medium having computer program codes to be executed by a computer, the computer including: an interface for receiving print data from a print-data generation source such as a host computer or the like; image generation means for generating image data by analyzing the print data received by the interface; a memory for temporarily storing the image data generated by the image generation means; operation means for performing rendering operation on the image data stored in the memory and the image data generated by the image generation means; compression means for compressing the image data stored in the memory; a second memory for storing the data compressed by the compression means for at least one page of an original image; expansion means for expanding the compressed data stored in the second memory; a printer engine for printing the image data expanded by the expansion means on a printing medium; and control means for controlling each of the aforementioned means, the printing control method comprising the steps of: generating image data by the image generation means in a unit of a band where one page of an original image is divided into areas of a predetermined size, performing rendering operation by the operation means on the image data to render the image data in the band unit, and compressing the band image data by the compression means, the image data generation step, the rendering operation step and the compression processing step being repeated until compressed data corresponding to one page of the original image is stored, and each of the means being synchronously operated; and wherein the printer engine is started when the data corresponding to one page of the original image is stored in the second memory, the compressed data is expanded by the expansion means in real-time in synchronization with a printing speed, resulting in an image being outputted by the printer engine.

Still further, in order to attain the above object, the present invention provides a printing system having a computer and a printer, the printer including: reception means for receiving color print data; mode-designation means for designating a mode in accordance with the color print data received by the reception means; development means for developing color image data and dividing the color image data into color component data in accordance with the color print data received by the reception means; storage means for storing the color component data developed by the development means; operation means for performing operation processing on the color component data stored by the storage means and the color image data developed by the development means, in accordance with an operation procedure corresponding to the mode, and output means for outputting color image operated by the operation means; and the computer including transmission means for transmitting color print data.

Still further, in order to attain the above object, the present invention provides a printing system having a computer and a printer, the computer including transmission means for transmitting print data; and the printer including: an interface for receiving print data from a print-data generation source such as a host computer or the like; image generation means for generating image data by analyzing the print data received by the interface; a memory for temporarily storing the image data generated by the image generation means; operation means for performing rendering operation on the image data stored in the memory and the image data generated by the image generation means; compression means for compressing the image data stored in the memory; a second memory for storing the data compressed by the compression means for at least one page of an original image; expansion means for expanding the compressed data stored in the second memory; a printer engine for printing the image data expanded by the expansion means on a printing medium; and control means for controlling each of the aforementioned means, wherein image data is generated by the image generation means in a unit of a band where one page of an original image is divided into areas of a predetermined size, rendering operation is performed by the operation means on the image data to render the image data in the band unit, and the band image data is compressed by the compression means, the image data generation, the rendering operation and the compression processing being repeated until compressed data corresponding to one page of the original image is stored, and each of the means being synchronously operated; and wherein the printer engine is started when the data corresponding to one page of the original image is stored in the second memory, the compressed data is expanded by the expansion means in real-time in synchronization with a printing speed, resulting in an image being outputted by the printer engine.

By virtue of the above configuration, the printing apparatus and control method according to the present invention reduces the required memory capacity for color printing, thereby realizing printing out of the image data received from a host computer without decreasing resolution or tone.

Moreover, on account of the reduced memory capacity, the cost necessary to configure the apparatus can be reduced.

Furthermore, on account of the rendering operation performed as necessary in the printing apparatus, it is possible to obtain an image on which a desired rendering operation has been performed without executing rendering operation on image data at an image data source, but can be obtained by simply designating output of the image data. Accordingly, process load at the data source can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 24 is a schematic view of a memory in the case where image data is generated on the basis of Y, M, C and K; and FIG. 25 is a schematic view of a memory in the case where image data is generated on the basis of R, G and B.

DETAILED DESCRIPTION OF THE PREFERRED EMBODIMENTS

Preferred embodiments of the present invention will be described in detail in accordance with the accompanying drawings.

[First Embodiment]

Figure 1:
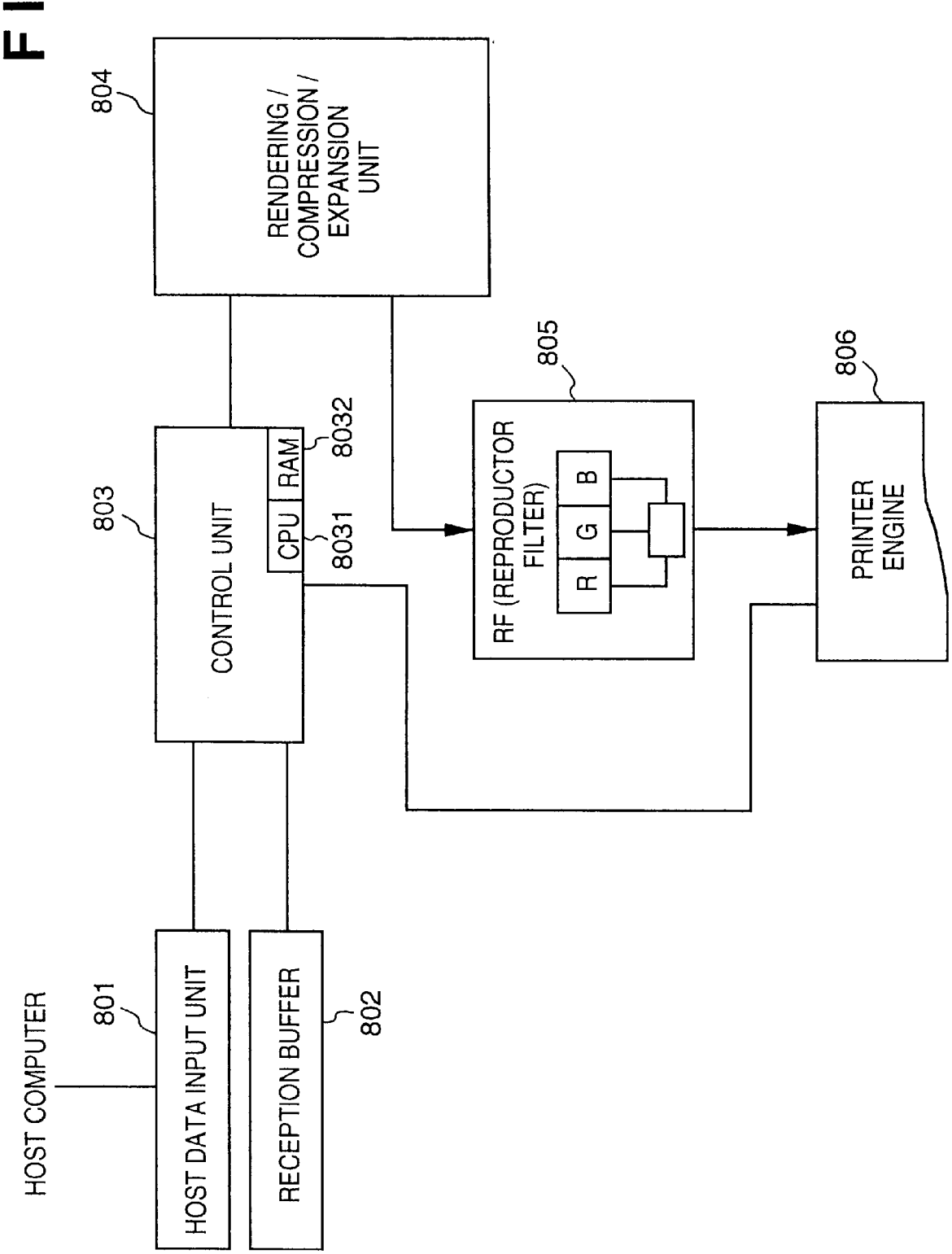
FIG. 1 is a block diagram of a color printing apparatus according to an embodiment of the present invention.

FIG. 1 is a block diagram of a color printer according to the first embodiment of the present invention. The color printer comprises the following units.

A host data input unit 801 receives image data to be outputted from a data supplying source such as a host computer or the like. More specifically, a parallel interface unit, serial interface unit, a network interface unit or the like may serve as the host data input unit 801.

A reception buffer 802 is capable of storing one page of rendering-instruction data inputted from the host computer. In the block diagram in FIG. 1, the reception buffer 802 is shown separately from an image memory which will be described later; however the buffer and the image memory may utilize a same memory. The memory may utilize any type (SRAM, DRAM or the like) of memory devices. Note that the rendering-instruction data includes an instruction and data (all printing data) for generating various forms of an image, such as character codes for generating an image of a character, figure codes for generating a figure, bit map data, or the like.

A control unit 803 controls the entire printer. More specifically, the control unit 803 controls analysis of inputted rendering-instruction data, generation of image data, as well as the entire printer, utilizing a processor e.g. a CPU or the like. The control unit 803 includes a CPU 8031 and a RAM 8032, and realizes controlling operation by the CPU 8031 by executing programs (processing steps described later with reference to a flowchart) stored in the RAM 8032.

A rendering/compression/expansion unit 804 stores image data generated by the control unit 803 in accordance with the rendering-instruction data from the host. The rendering/compression/expansion unit 804 is constituted by a band image memory, a data compression unit, a compressed-data storing memory, data expansion unit, DMA control unit and the like whose details will be described later. Note that the memory used herein is assumed to be e.g. a DRAM, SRAM or the like, however the memory is not limited to this. Also, the compression/expansion scheme is not limited to a specific method. In the present embodiment, it is assumed that the memory is constituted by a DRAM and the compression/expansion processes employ the well-known JPEG method.

A reduction filter (RF) unit 805 converts inputted R, G and B data to Y, M, C and K data when the image data generated by the rendering/compression/expansion unit 804 is transferred to a printer engine 806 which will be described later. With respect to a method of converting RGB→YMCK, a method utilizing matrix operation is well known. In the printer of the present embodiment, since emphasis is given to conversion speed, the conversion is realized by hardware referring to a parameter table. The RF unit 805 outputs each color component of Y, M, C and K (hereinafter referred to as a device color) data for an inputted R, G and B image. Then, the outputted device-color data is supplied to the printer engine 806.

The printer engine 806 receives the image data and fixes a color image on a print sheet. The printer engine 806 sequentially performs rendering for each of the device-color planes to generate one page of color image to be outputted. To be more specific, a color LBP (laser beam printer), each color having 8 bits, is utilized. The configuration thereof will be described later with reference to an accompanying drawing.

Figure 2:
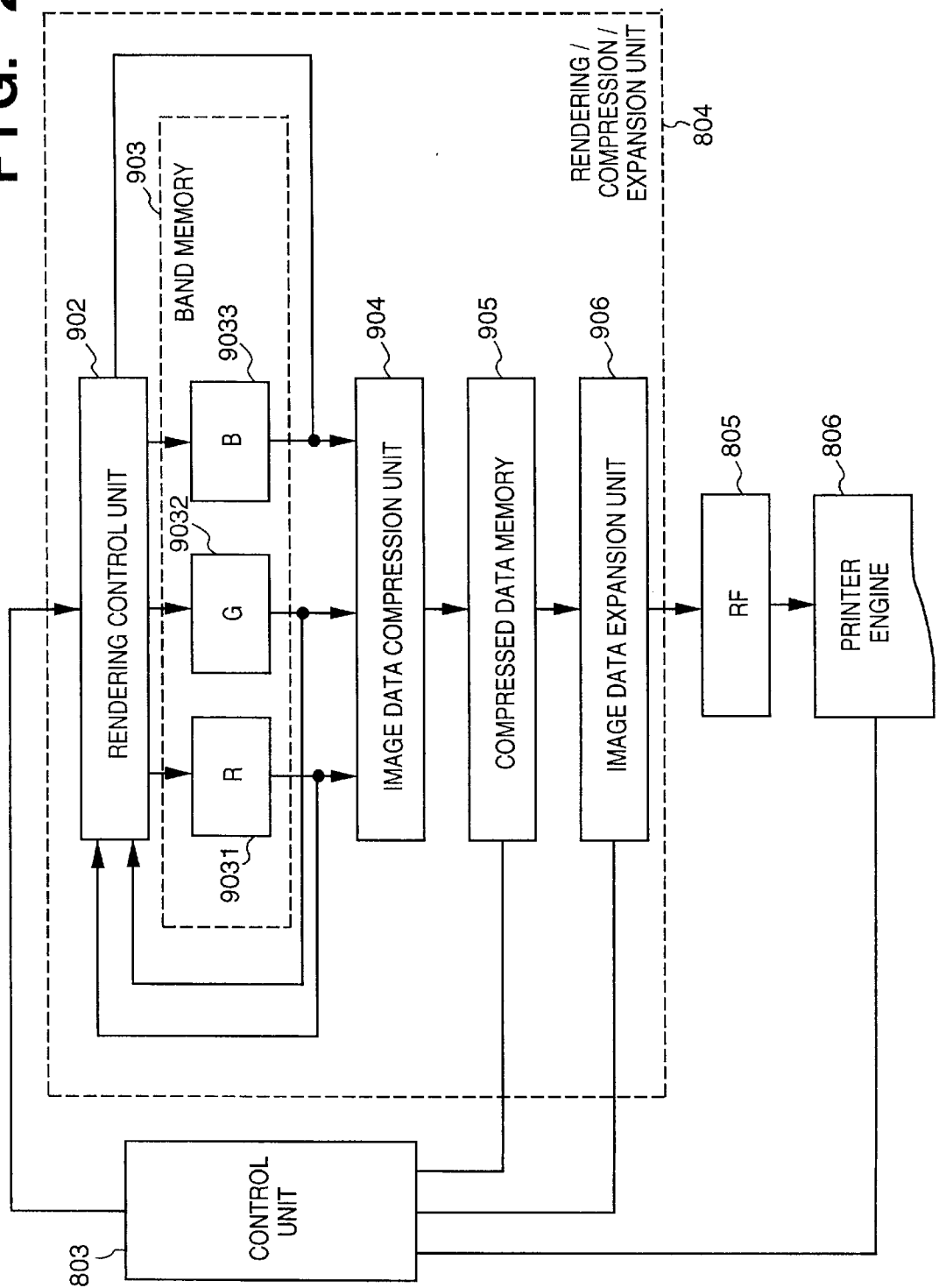
FIG. 2 is a block diagram illustrating data flow operation of data processing.

FIG. 2 is a general view showing a configuration of the rendering/compression/expansion unit 804 as well as a connection between the control unit 803 and the printer engine 806.

A rendering control unit 902 performs operation to obtain mixed colors of image data generated by the control unit 803 and image data stored in a band memory 903. In order to obtain the mixed colors, rendering operation is performed and the result of the operation is stored again in the band memory 903. The band data stored in the band memory 903 corresponds to an area where one page of an image is divided by a predetermined size, and by connecting these areas together, one page of an image is constructed.

The band memory 903 stores band data under the control of the control unit 902, and in the present embodiment, is constituted by memory blocks 9031, 9032 and 9033 independently established for each of R, G and B band planes.

An image-data compression unit 904 compresses image data utilizing a well-known method. In the present embodiment, it is assumed that pixel data in R, G and B each having 8 bits which is stored in the band memory 903 is compressed by the JPEG method. A compression memory 905 stores band data compressed by the image-data compression unit 904. In the compression memory 905, a plurality of compressed band data are stored, and data corresponding to at least one page of an output image is stored.

An image-data expansion unit 906 expands (in the present embodiment, JPEG expansion) the compressed band image data which corresponds to one page of an output image and is stored in the compression memory 905, in accordance with a data rate necessary for the printer engine 806.

The printer engine 806 fixes the data expanded by the image-data expansion unit 906 on a printing medium e.g. a print sheet, realizing print out operation. Herein, it is assumed to utilize a color LBP which performs printing in Y, M, C and K each having 8 bits that is converted by the RF unit 805.

Figure 3:
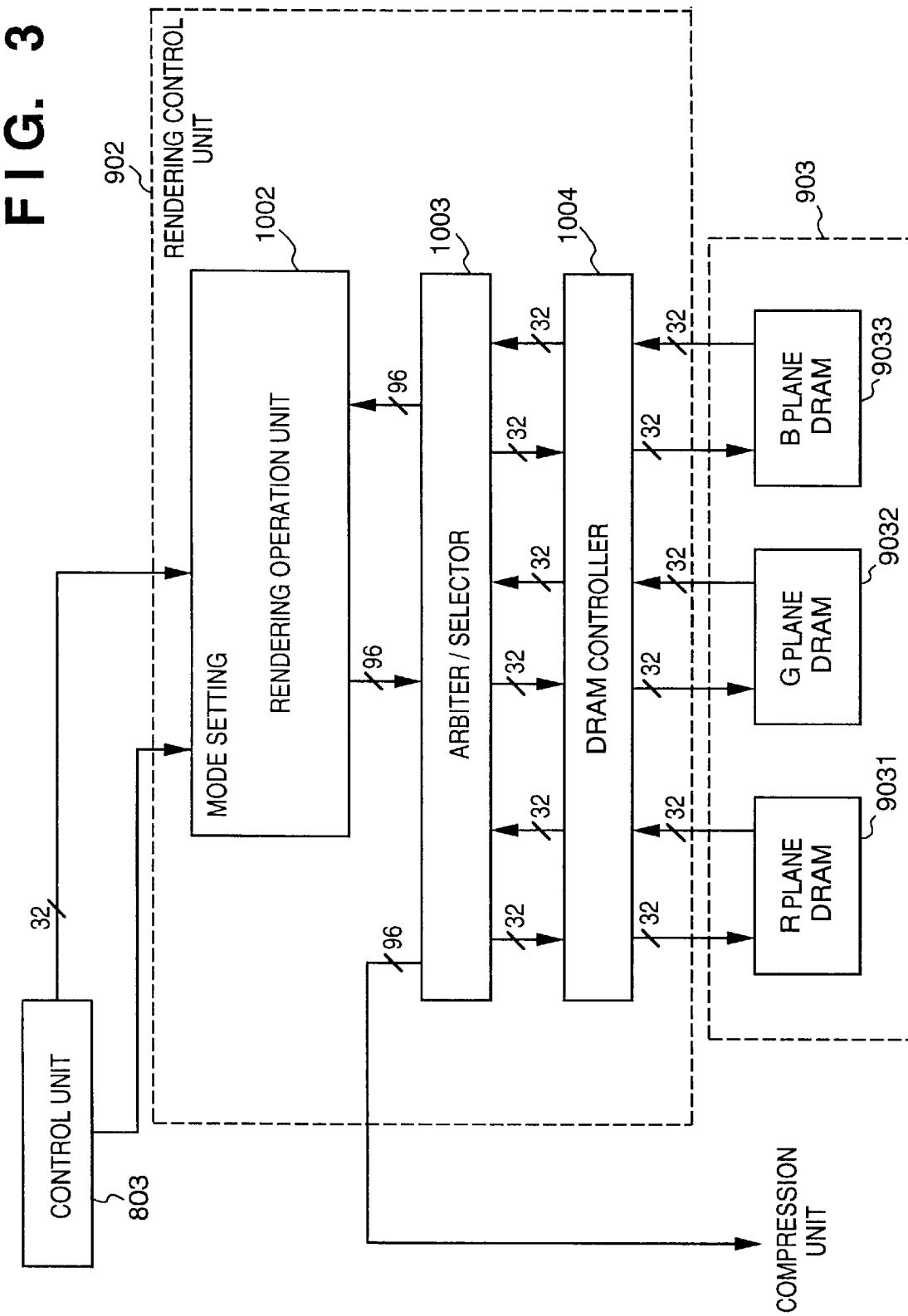
FIG. 3 is a block diagram showing a structural relationship between a band memory and a rendering operation unit.

FIG. 3 is a block diagram for explaining in detail the peripheral units of the rendering control unit 902. The control unit 803 generates rendering image data and determines the rendering operation procedure in accordance with rendering-instruction data from the host computer.

A rendering operation unit 1002 performs rendering operation utilizing the image data generated by the control unit 803 and the data stored in the band memory 903 in accordance with the rendering operation procedure determined by the control unit 803, and generates image data representing the result of the operation.

An arbiter/selector unit 1003 arbitrates between an access from the rendering operation unit 1002 to the band memory 903 and an access from a compression unit 905 which will be described later to the band memory 903.

In the present embodiment, the band memory 903 is constituted with a DRAM which is controlled by a DRAM controller 1004. The DRAM controller 1004 generates an access cycle from an access source determined by the arbiter/selector unit 1003 to a DRAM device constituting the band memory 903, and refreshes the DRAM or the like.

The band memory 903 temporarily stores image data corresponding to one band. In the present embodiment, the DRAM banks each of which is independently established, that is, the R plane 9031, G plane 9032 and B plane 9033, constitute the band memory 903. Data is written/read to each plane in a unit of 32 bits.

Figure 4:
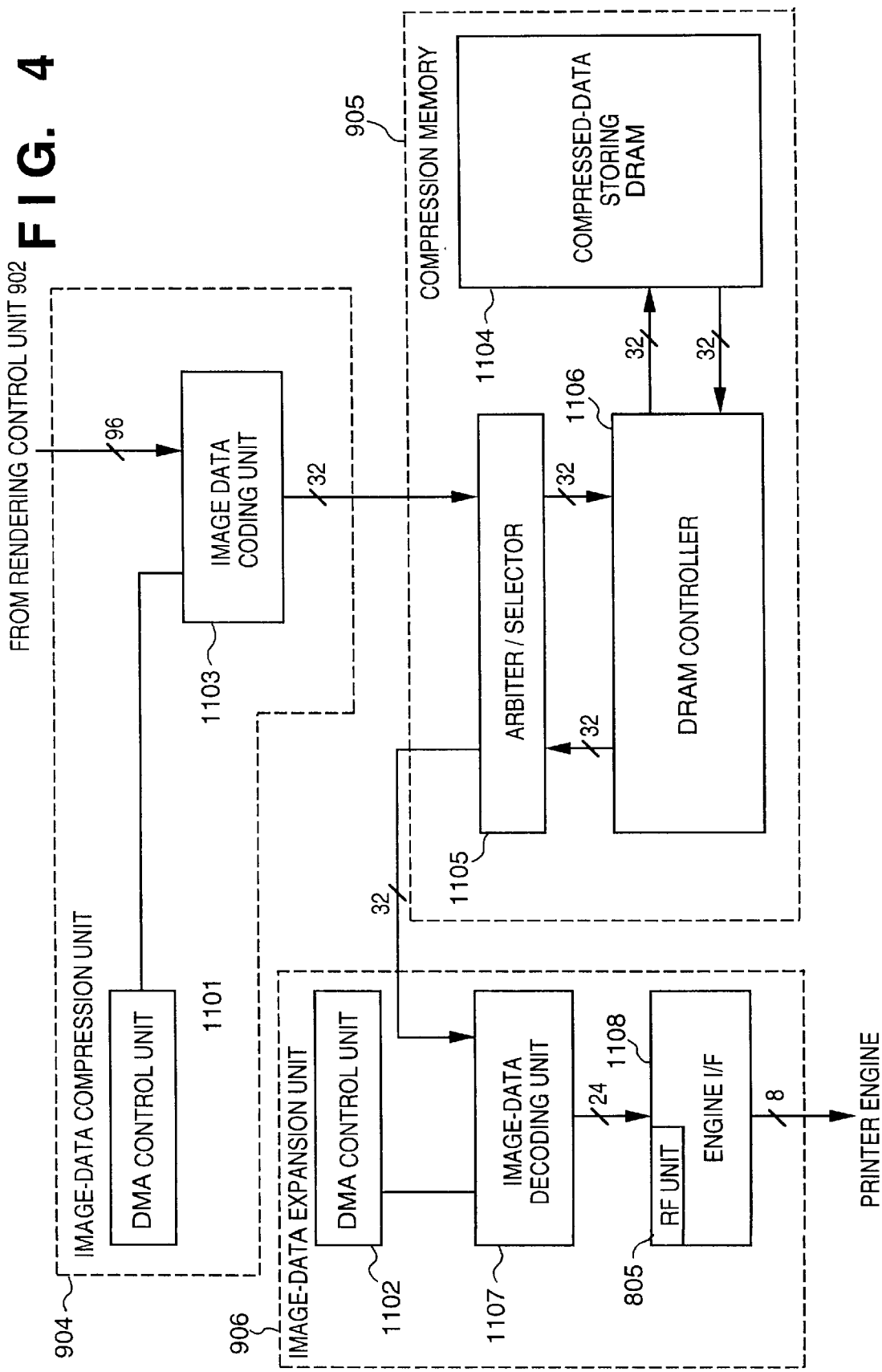
FIG. 4 is a block diagram showing a structural relationship among a data compression unit, a DRAM for storing compressed data, and an image-data expansion unit.

FIG. 4 is a block diagram for explaining in detail the peripheral units of the image-data compression unit 904, compression memory 905 and image-data expansion unit 906.

In FIG. 4, a DMA control unit 1101 transfers image data from the band memory 903 to an image-data coding unit 1103.

A DMA control unit 1102 transfers compressed image data from a compressed-data storing DRAM 1104 to an image-data decoding unit 1107 via a DRAM controller 1106 and an arbiter/selector 1105.

The image-data coding unit 1103 compresses image data from the band memory utilizing the JPEG method.

The compressed-data storing DRAM 1104 stores at least one page of data compressed by the image-data coding unit 1103. Although a DRAM is utilized herein, it may be substituted with an SRAM as long as compression/expansion processing of image data is performed in a sufficient speed. At the time of printing, one page of the compressed data is first stored in the compressed-data storing DRAM 1104.

The arbiter/selector 1105 arbitrates between an access cycle from the image-data coding unit 1103 to the compressed-data storing DRAM 1104, and an access cycle from the image-data decoding unit 1107 to the compressed-data storing DRAM 1104.

The DRAM controller 1106 controls operation of the DRAM, e.g. generation of an access cycle between the arbiter/selector 1105 and the compressed-data storing DRAM 1104, a refresh cycle and the like.

The image-data decoding unit 1107 performs data expansion on the compressed data stored in the compressed-data storing DRAM 1104 at the time of printing operation, in accordance with printing speed (data rate) of the printer engine 806.

An engine interface 1108 is connected to the color printer engine 806, which prints out the data sent from the image-data decoding unit 1107 on a printing medium such as a print sheet or the like, to perform controlling of various printer engines and data transfer.

Figure 5:
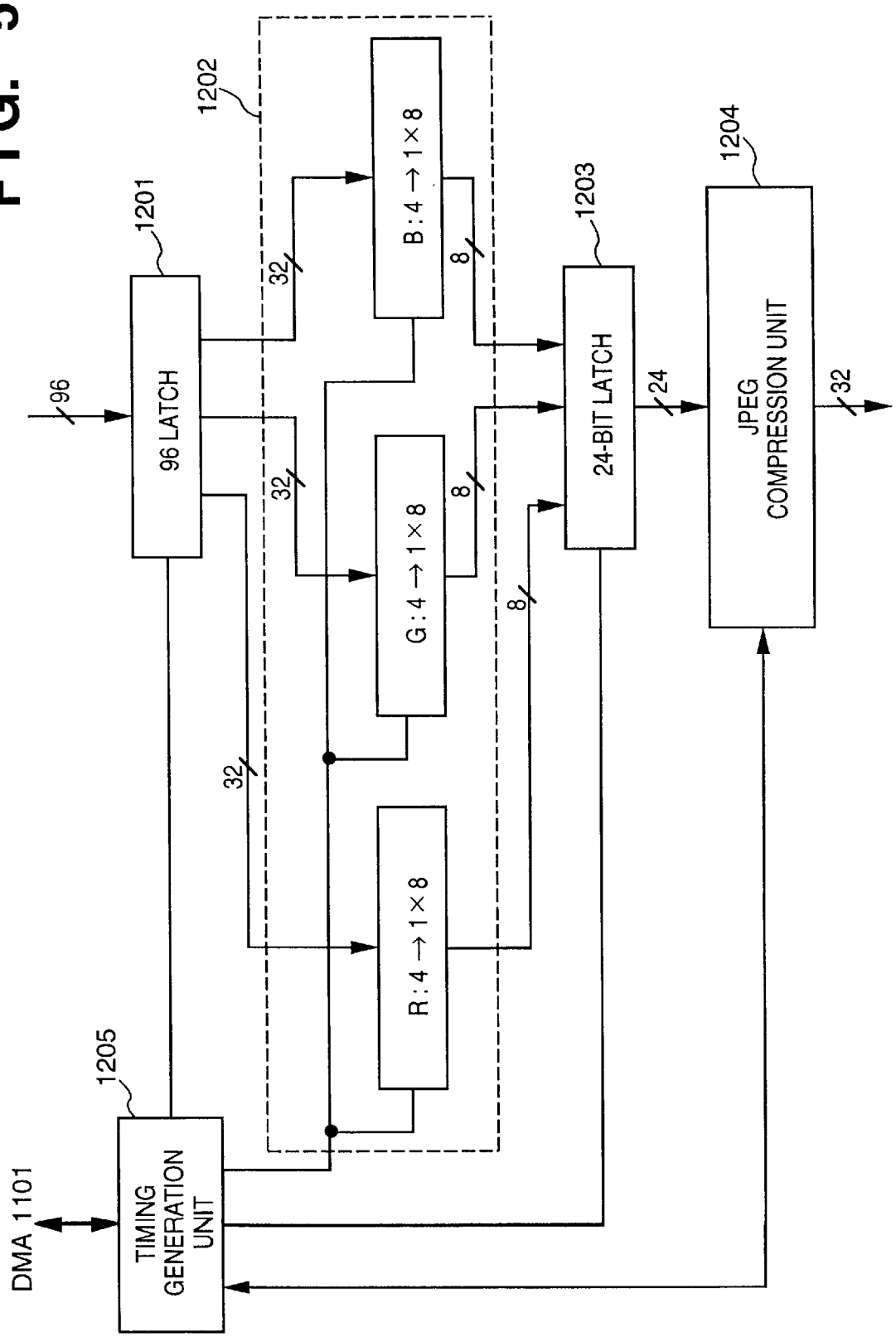
FIG. 5 is a block diagram for explaining data flow in the data compression unit.

FIG. 5 shows detailed configuration of the image-data coding unit 1103 shown in FIG. 4. A 96-bit-latch 1201 latches plane data (32 bits×3 planes) from the memories 9031, 9032 and 9033 respectively corresponding to R, G and B planes, where data is read/written in a unit of 32 bit (one word).

A selector 1202 comprises eight 4-to-1 selectors for each plane. The selector 1202 selects 8 bits (1 pixel) from 32 bits (4 pixels) with respect to each of the R, G and B colors. Note that 1 pixel is expressed by R, G and B colors each having 8 bits i.e. includes 24-bit(8×3) data.

A 24-bit latch 1203 latches data corresponding to 1 pixel (8×3=24 bits) whose R, G and B each having 8 bits, selected by the selector 1202.

A JPEG compression unit 1204 compresses the data latched by the latch 1203 in a unit of R, G and B data in one pixel.

A timing generation unit 1205 generates a synchronous timing for each of the units in FIG. 5, in addition to a timing synchronous with the DMA control unit 1101 for managing data transfer from the band memory 903 in FIG. 3.

Next, operation of the color printer according to the present embodiment constituted by the above described units will be described with reference to the flowchart shown in FIG. 7. The flowchart is realized by the CPU 8031 of the control unit 803 executing programs stored in the RAM 8032. The flowchart partially includes processing steps of the rendering operation unit 1002 which is a controlled unit.

Rendering-instruction data including an image output instruction is first inputted from the host computer via the host data input unit 801 (S1401). The rendering-instruction data at this stage is a printer language such as a PDL (Printer Description Language) or a command array such as an escape sequence predetermined by a printer.

The inputted rendering-instruction data is once stored in the reception buffer 802 (S1402). Any type of method may be utilized for storing the data in the reception buffer 802. Herein, the control unit 803 transfers one page of data from the host data input unit 801 to the reception buffer 802.

After the one page of the rendering-instruction data is stored in the reception buffer 802, the control unit 803 initializes each unit of the printer to start rendering processing (S1403). For instance, each DRAM plane of the band memory 903 is cleared, the arbiter/selector 1003 in FIG. 3 selects an access path for the rendering operation unit 1002, various setting of the rendering operation unit 1002 is set, and so on. Note that the sequence of the process is not limited to the above.

Figure 8:
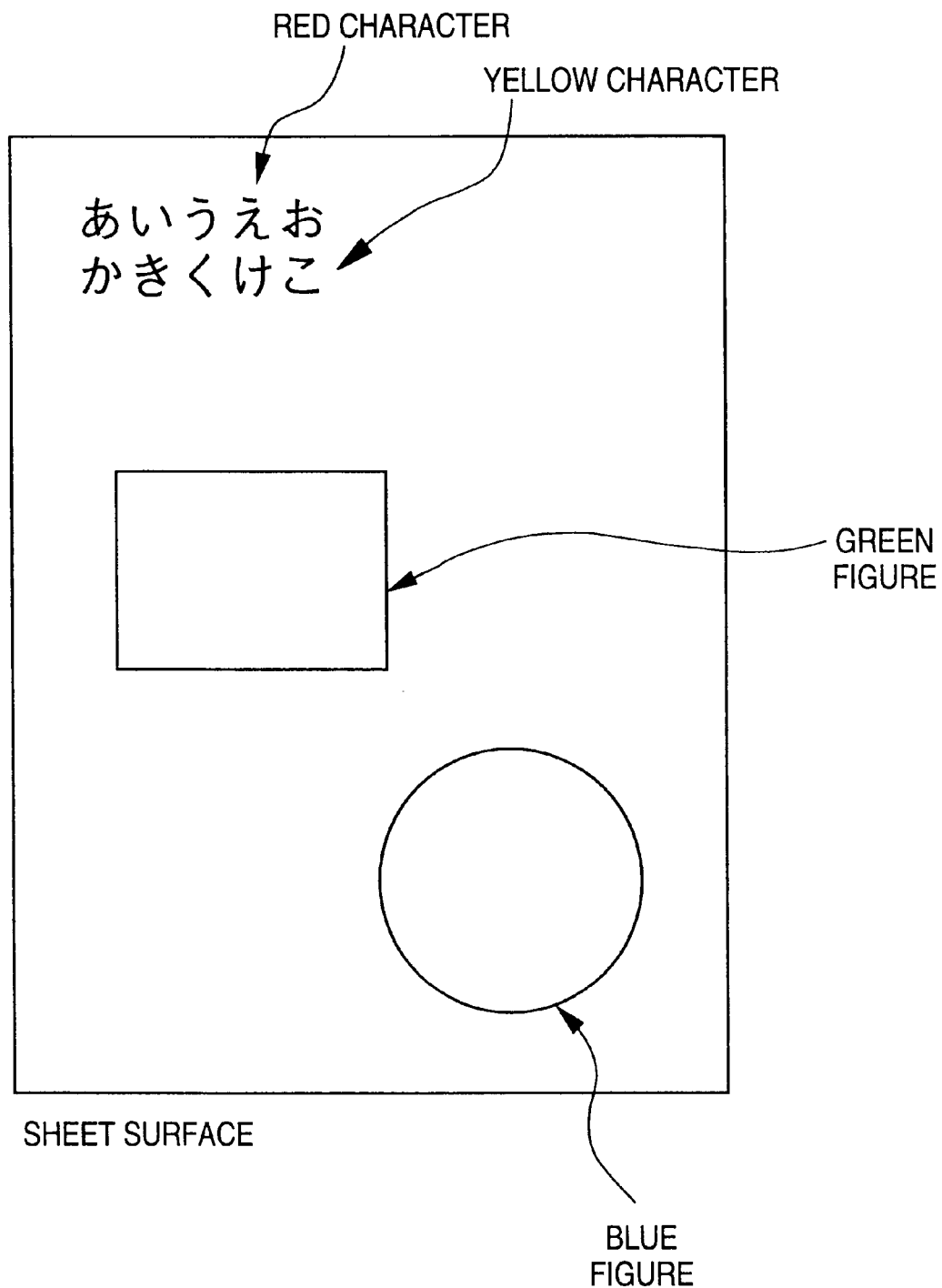
FIG. 8 shows a sample of a printout in a case where rendering operation for calculating overlapped colors is not performed.
Figure 9:
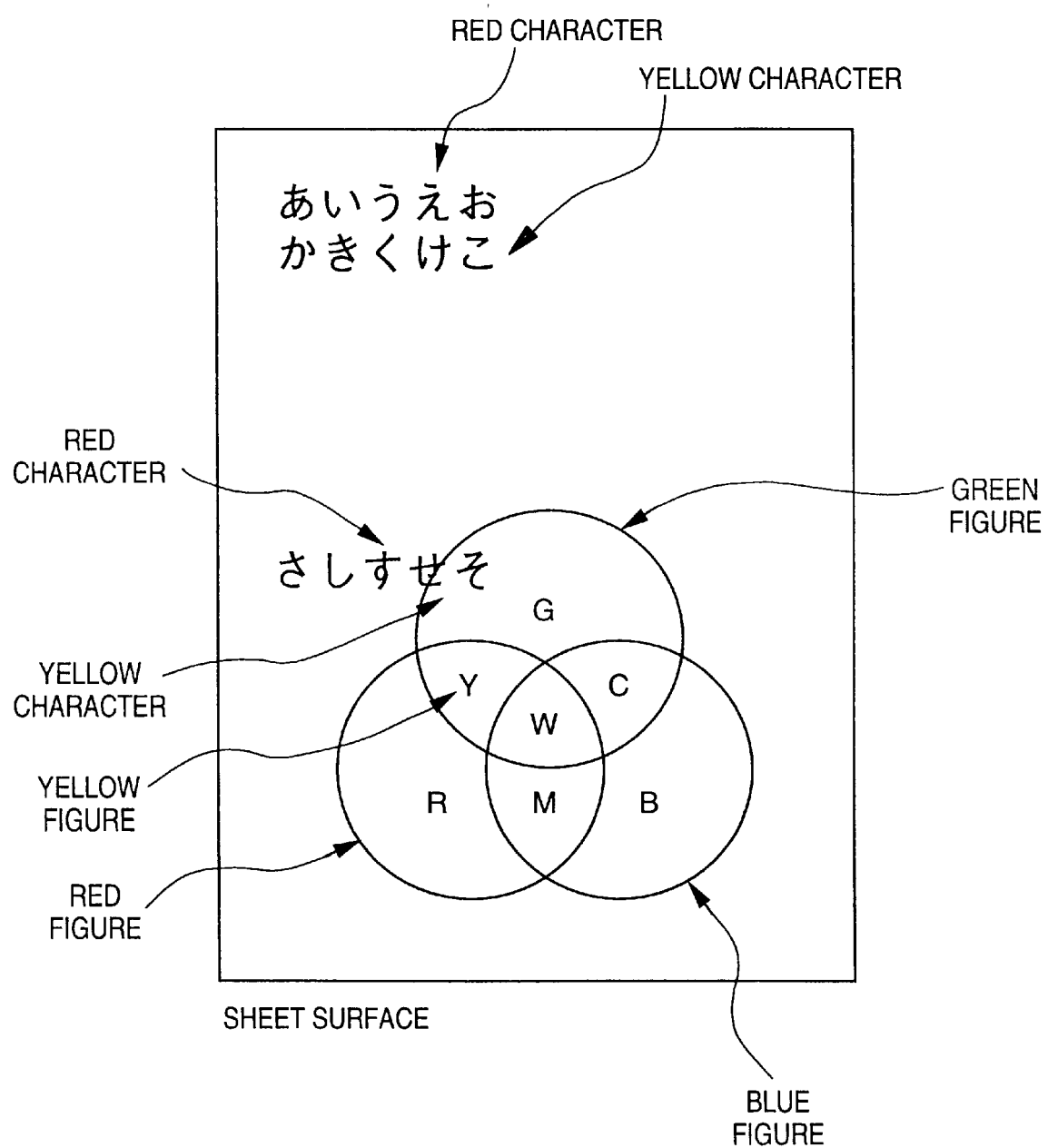
FIG. 9 shows a sample of a printout in a case where rendering operation for calculating overlapped colors is performed.

The control unit 803 analyzes the rendering instruction data stored in the reception buffer 802 (S1404), and generates image data in a predetermined process step in accordance with the analysis result (S1405). Then the control unit 803 determines a rendering mode for the image data, and sets the determined rendering mode in the rendering operation unit 1002 (S1406). For example, there is output image data which does not require the rendering operation for calculating overlapped colors such as that shown in FIG. 8, and image data which requires the rendering operation as that shown in FIG. 9. For the former case (FIG. 8), a rendering mode where the image data generated by the control unit 803 to be stored in the band memory is overwritten in color planes, is set. In the latter case (FIG. 9), an appropriate rendering mode (rendering operation procedure) is set for the data to be stored depending on where the image data to be rendered is positioned. Note that the circuit structure for performing rendering operation may adopt any means or method as long as the functions described above are realized. For instance, a normal processor may execute programs for performing rendering operation on given image data according to a designated rendering mode.

When the control unit 803 generates a storing cycle of storing rendering data (specifically, a data write cycle in the rendering operation unit 1002), the rendering operation unit 1002 where a rendering mode is set, generates a read cycle of the rendering data stored in the band memories 9031, 9032 and 9033 in accordance with an address generated in the write cycle of the control unit 803. By this, image data for each of R, G and B planes, that is, 96-bit data (32 bits×3 planes), is read; and rendering operation is performed (S1407) in accordance with the set rendering mode, utilizing the read 96-bit data and 32-bit data generated in the write cycle of the control unit 803. The resultant 96-bit data is stored in band memories 1005, 1006 and 1007 (S1408). In other words, when the control unit 803 writes data in a band memory, data which has already been stored in an address of a band memory to be written is first read, then rendering operation is performed using the read data and the data to be written in accordance with a predetermined rendering mode, and the result of the operation is written in an address of the original band memory. Note that the band memory stores no data in the initial data storing cycle, thus the memory is blank.

Figure 6:
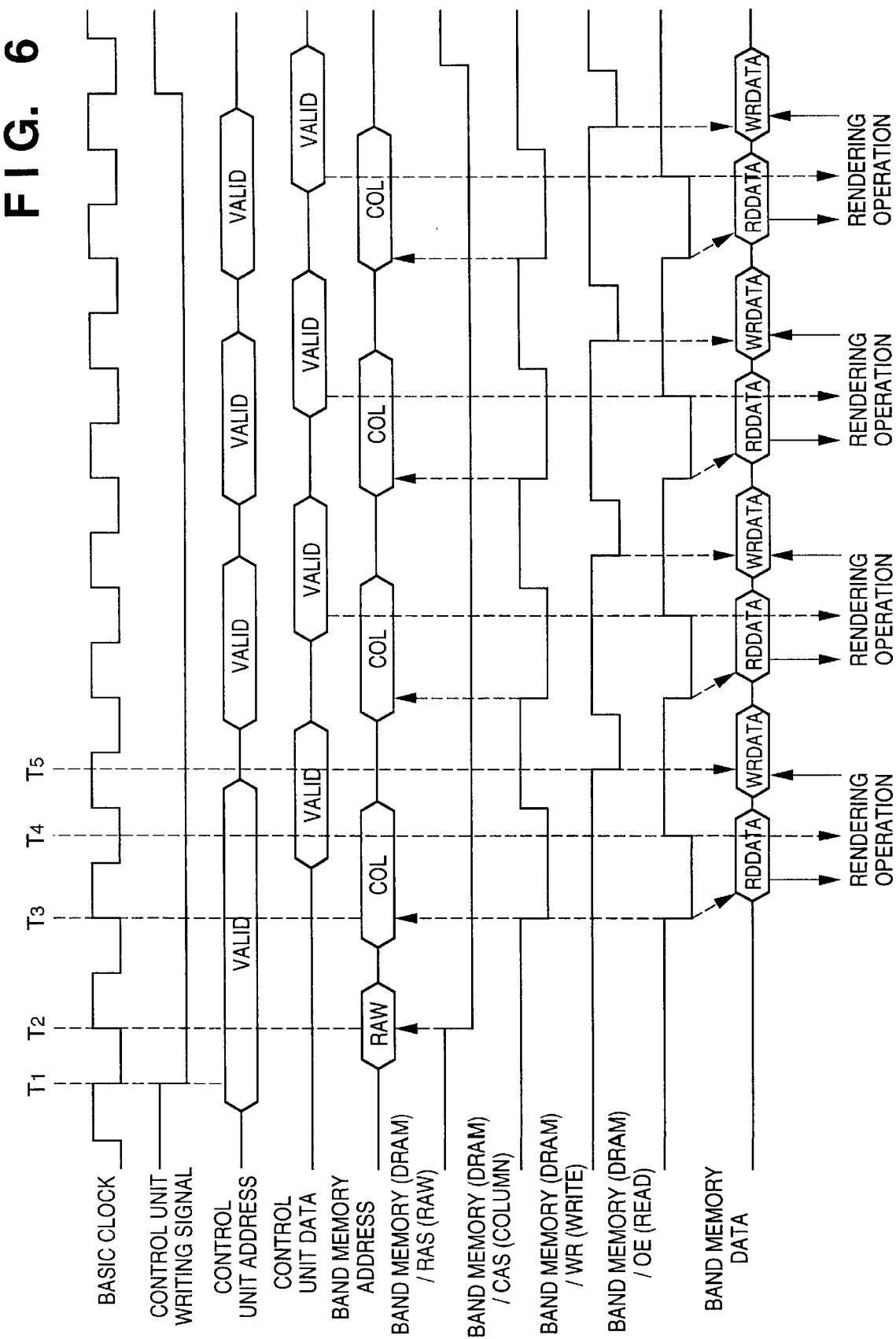
FIG. 6 is a timing chart showing access relationships between the rendering operation unit and a band memory DRAM.

The rendering operation cycles in steps S1407 and S1408 are shown in the timing chart in FIG. 6. In the timing chart, a read-modify-write cycle in a burst cycle is shown as an example. It is assumed that the control unit 803 is capable of generating a burst-write cycle in a unit of four words (one word=32 bits). Furthermore, as described above, a rendering mode predeterminedly set in the rendering operation unit 1002 specifies how the data written by the control unit 803 is to be expressed, e.g. an image object is overwritten, a transparent color is provided, all colors are mixed, or the like.

Figure 11:
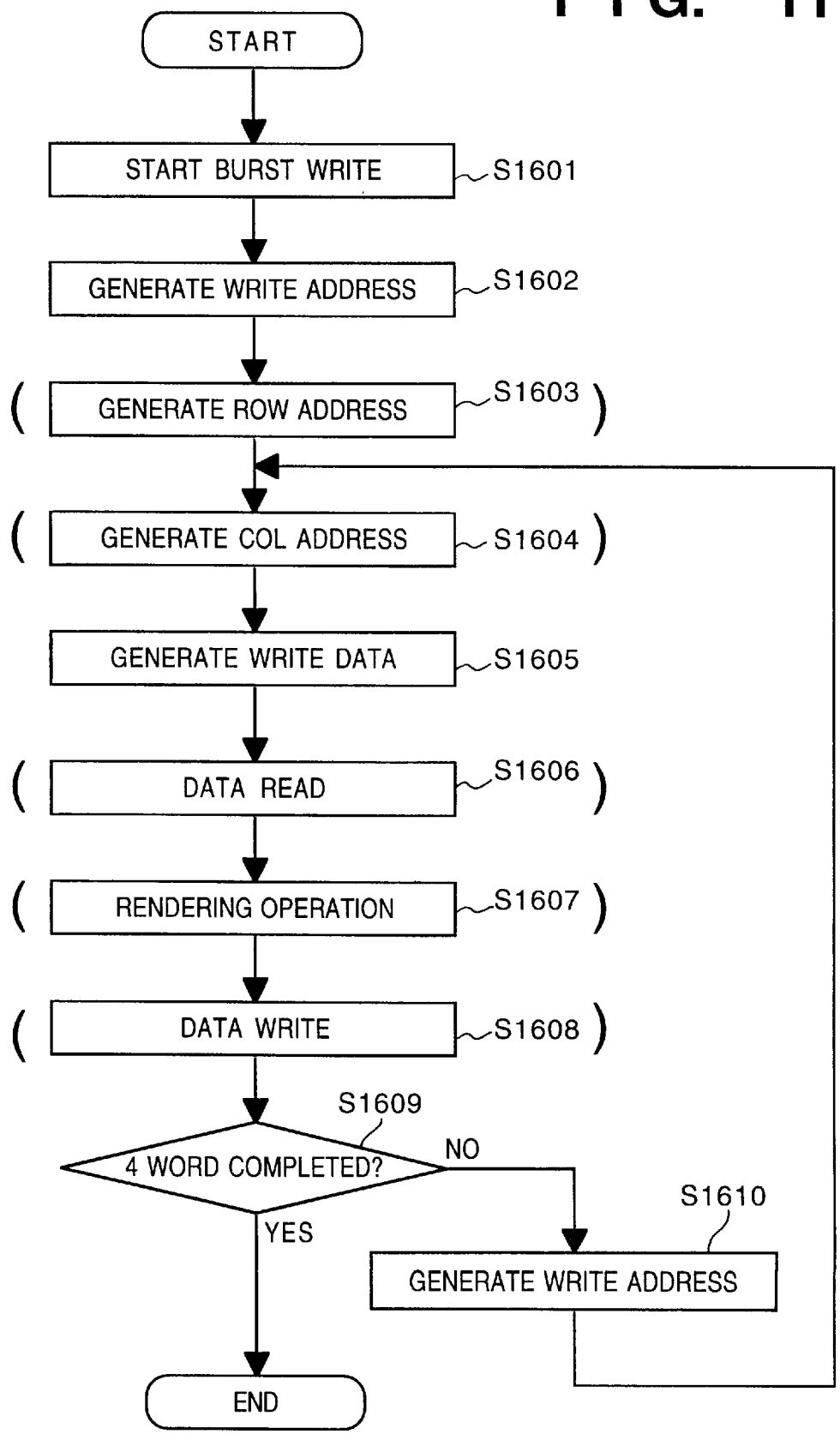
FIG. 11 is a flowchart describing a sequence of an access cycle of the rendering operation unit accessing to the band memory.

The processing sequence of the timing chart in FIG. 6 will be described with reference to a flowchart shown in FIG. 11. FIG. 11 shows both processing sequences of the control unit 803 and the rendering operation unit 1002. The step reference numeral indicated in parenthesis in FIG. 11 is performed by the rendering control unit 902 corresponding to the operation of the control unit 803.

In FIG. 11, the control unit 803 starts a write cycle by activating a write signal at a timing T1 which generates four-word burst cycle (S1601).

Next, the control unit 803 generates a data-write address (S1602).

In accordance with the address generated by the control unit 803, the DRAM controller 1004 generates a ROW address of each of the plane band memories 9031, 9032 and 9033 at a timing T2 (S1603).

The DRAM controller 1004 also generates a COLUMN address of each of the plane band memories 9031, 9032 and 9033 at a timing T3 (S1604).

The control unit 803 generates write data which is the data to be written at a timing T4 (S1605).

The DRAM controller 1004 first generates read cycle of the read-modify-write cycle at the timing T3 to supply 96-bit data (4 pixels=3 planes×8 bits×4 pixels) from each of the R, G and B planes to the rendering operation unit 1002 (S1606).

Next, the rendering operation unit 1002 performs rendering operation on the write data generated by the control unit 803 (step S1605) and the RGB 96-bit data supplied in step S1606, in accordance with set values of the rendering mode designated by the control unit 803 (S1607). To be described with reference to FIG. 6, the rendering operation unit 1002 performs rendering operation on the control unit data "VALID" and the data "RDDATA" read from the band memory DRAM.

The DRAM controller 1004 writes the data outputted from the rendering operation unit 1002 in the DRAM as write-cycle data of the read-modify-write cycle at a timing T5 (S1608). At the same time, the write cycles of writing data to the DRAM banks, in which each of R, G and B plane data is respectively stored, is generated simultaneously. In other words, at the timing indicated by the band DRAM data "WRDATA" in FIG. 6, data is written in the three banks simultaneously.

Since the burst-read-modify-write cycle in a unit of four words is adopted in the present embodiment, determination is made as to whether or not a read-modify cycle for four words is completed (S1609). If it is not completed, the processing proceeds to step S1610; but if it is completed, the processing ends for a burst-read-modify cycle.

In step S1609, if the cycle for 4 words is not completed, the control unit 803 generates a next data-wiring address where data is to be stored (S1610), and the processing returns to step S1604.

Figure 7:
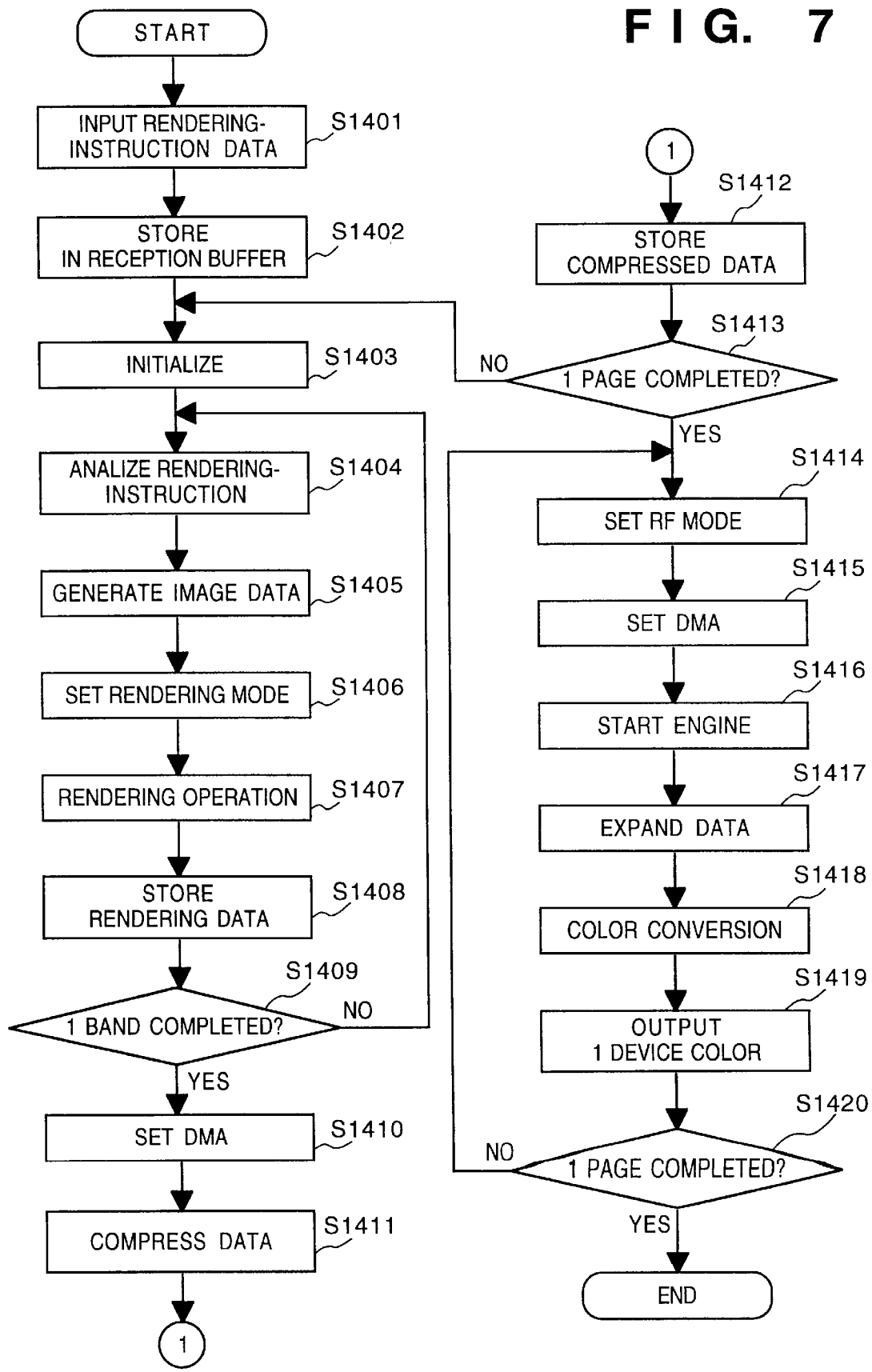
FIG. 7 is a flowchart showing operation of the present embodiment.

Steps S1407 and S1408 in FIG. 7 are executed as above, and now descriptions will return to the flowchart in FIG. 7.

When rendering operation is performed on the rendering data and stored in each of the band memories for R, G and B, determination is made as to whether or not rendering for a unit of one band is completed (S1409). If it is not completed, the processing returns to step S1404, but if it is completed, the processing proceeds to step S1410.

Upon completion of rendering for a unit of one band, the control unit 803 sets a parameter in the DMA control unit 1101 and the image-data coding unit 1103 shown in FIG. 4 (S1410). More specifically, the band memories 9031, 9032 and 9033 for each of R, G and B is set as a data source; the image-data coding unit 1103 is set as a destination; and data amount of one band is designated as an amount of data transfer. As a parameter for storing output data in the image-data coding unit 1103 (it may be assumed that image-data coding unit 1103 also includes DMA), a DRAM of the image data coding unit 1103 is set as a source, and the image-data storing DRAM 1104 is set as a destination.

The control unit 803 starts the DMA control unit 1101 and performs image data compression in a unit of one band (S1411).

Figure 10:
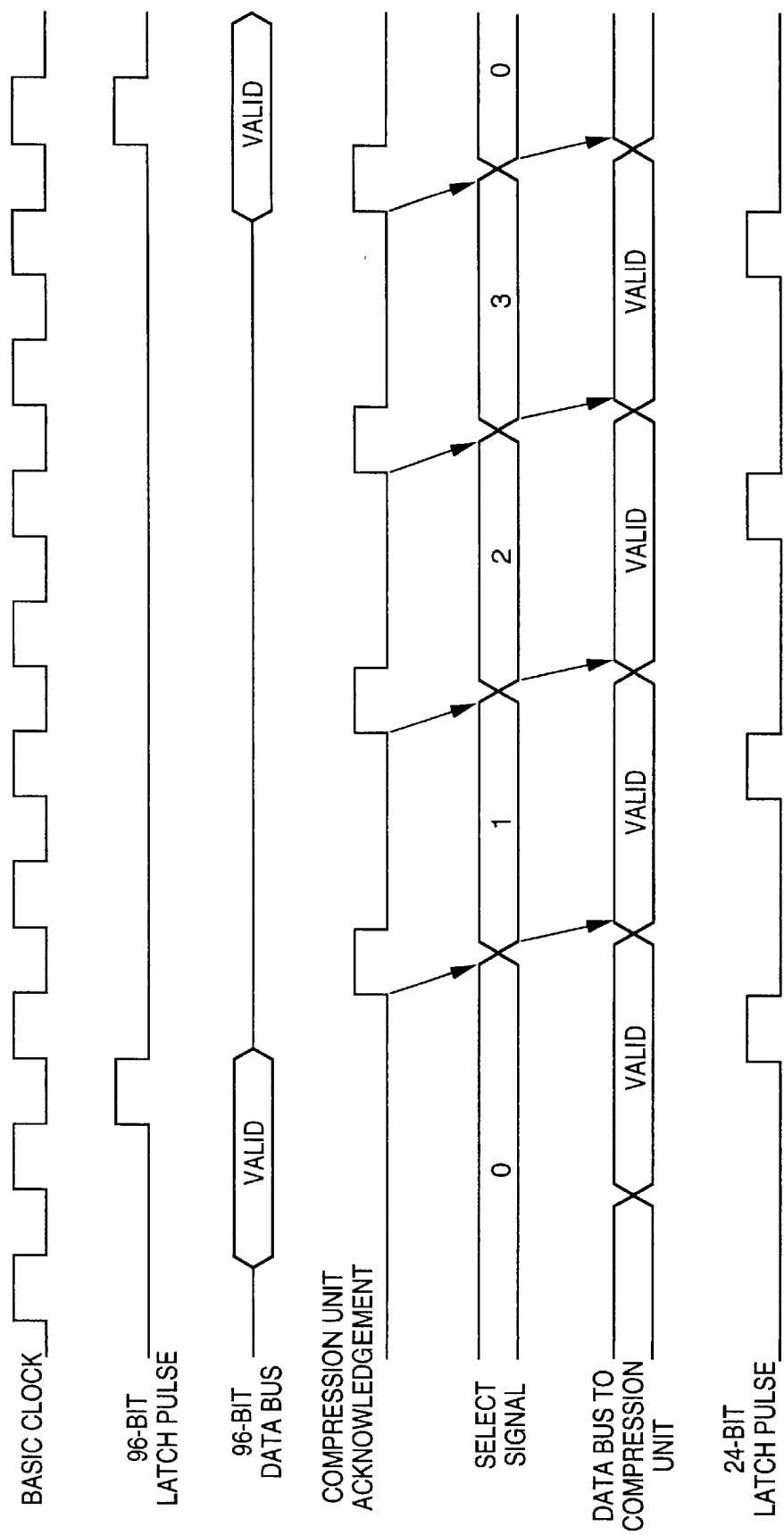
FIG. 10 is a timing chart showing data flow in the data compression unit.
Figure 12:
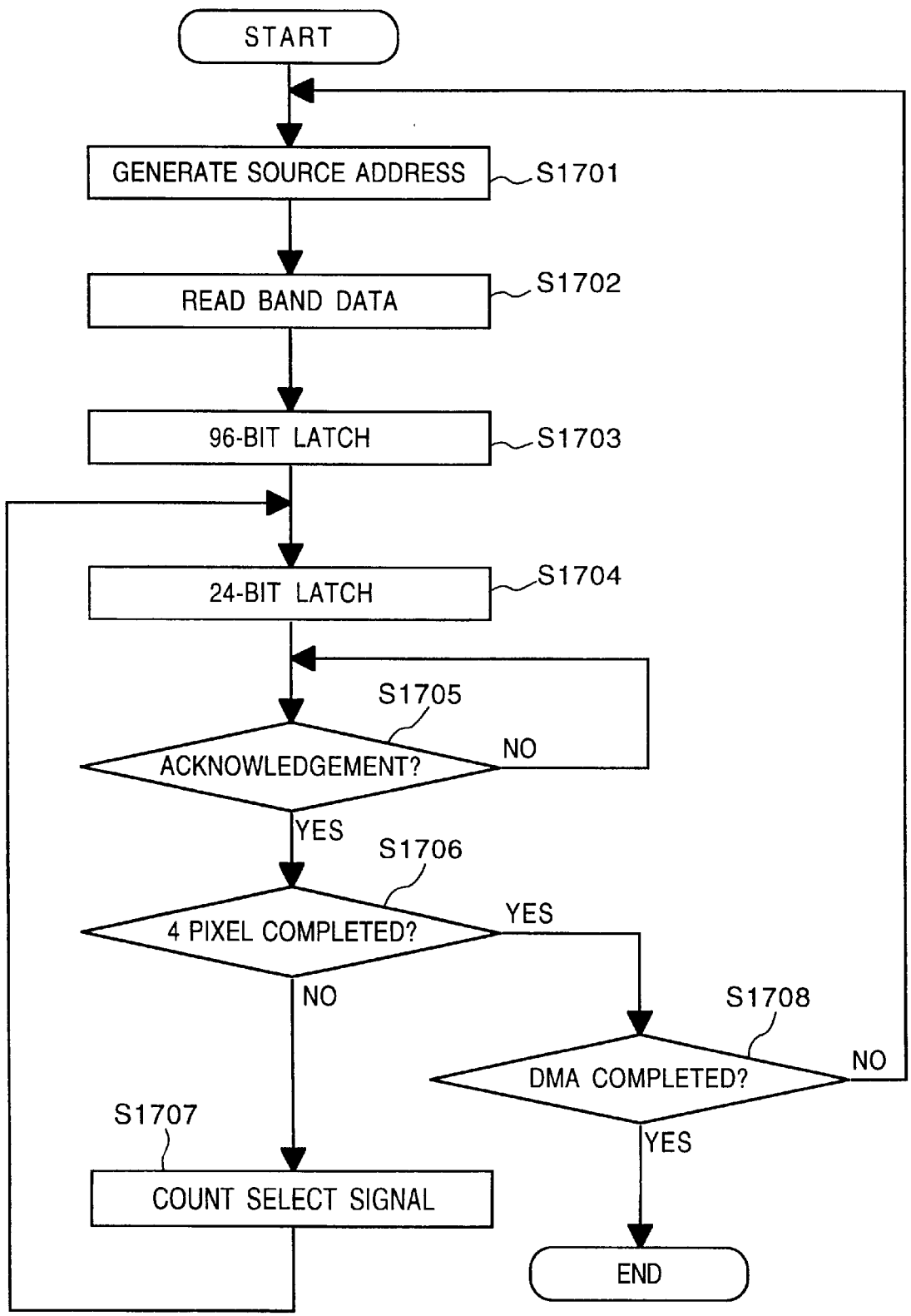
FIG. 12 is a flowchart describing a data transfer process from the band memory to the data compression unit.

A data transfer process to the image-data coding unit 1103 is shown in a timing chart in FIG. 10. The transfer process performed by the DMA control unit 1101 will be described with reference to the flowchart in FIG. 12.

First the DMA control unit 1101 generates a source address of the band memory 903 serving as a data source (S1701), thereby generating a read cycle of 96-bit data (one read cycle of the band memory)(S1702). The 96-bit data includes 4 pixels of R, G and B data.

Next, the 96-bit data read from the band memory 903 is latched in the 96-bit-latch 1201 in FIG. 5 (S1703). Herein, image data corresponding to 4 pixels is latched in the 96-bit-latch 1201. Each timing signal is generated by the timing generation unit 1205.

1 pixel is selected from the latched 4 pixels of 96-bit data for each color having 8 bits via the selector 1202 and latched in the 24-bit latch (S1704).

The 1 pixel is compressed by the image-data coding unit 1103, and the DMA control unit 1101 awaits for an acknowledge signal, which indicates completion of processing for 1 pixel, sent from the compression unit (S1705).

When the acknowledge signal is received, determination is made as to whether or not the processing for 4 pixels is completed (S1706). If it is not completed, the processing proceeds to step S1707; and if it is completed, the processing proceeds to step S1708.

If the processing is not completed, the timing generation unit 1205 counts-up a select signal for selecting the next pixel data (S1707), and returns to step S1704 to latch 24 bits of the next pixel.

When the processing for 4 pixels is completed, determination is made as to whether or not the DMA control unit 1101 has completed the data transfer process (S1708). If it is not completed, the processing returns to step S1701 to perform processing for next data (4 pixels) in the band memory.

Data compression is performed in the above described manner. The subsequent processing will be described with reference to the flowchart in FIG. 7.

The image-data coding unit 1103 outputs compressed data on the basis of pixel data, as described above. The arbiter/selector 1105 stores the compressed data through the DRAM controller 1106 in the compressed-data storing DRAM 1104 (S1412).

Upon completion of generating compressed data for one page, the processing of the control unit 803 proceeds to step S1414 to perform printing. If the generation is not completed, the processing returns to step S1403 to repeat the rendering/compression processing for the next band in the above described sequence (S1413). Note that in step S1413, the control unit 803 determines the progress of the rendering process by, for instance, receiving an interruption signal indicating data transfer completion.

When the generation and compression of rendering data for one page is completed in step S1413, the RF unit 805 is set according to a process procedure of the printer engine 806 (S1414). For instance, if the printer engine forms an image in a sequence of Y, M, C and K, parameter setting in the RF unit 805 is performed four times for outputting one page of color image, once for printing each color data. Note that the RF unit 805 in FIG. 4 is included in the engine I/F 1108.

Next, the control unit 803 sets each parameter e.g. a data source, a data destination, a data length and the like, in the DMA control unit 1102. If necessary, print preparation is performed by setting parameters in the image-data decoding unit 1107 and the engine I/F 1108 (S1415).

The control unit 803 starts the printer engine 806 to start printing operation (S1416).

The started printer engine 806 generates a synchronization signal. Operation of the engine I/F 1108, the image-data decoding unit 1107 and the DMA control unit 1102 is started in accordance with the synchronization signal. The DMA control unit 1102 supplies compressed data from the compressed-data storing DRAM 1104 to the image-data decoding unit 1107 via the DRAM controller 1106 and the arbiter/selector 1105 for expanding the compressed image data (S1417).

By expanding the compressed data, 24-bit pixel data constituted with R, G and B each having 8 bits is generated and supplied to the engine I/F 1108. Based on the R, G and B data, the RF unit 805 outputs one device-color data (8 bits) having any of Y, M, C and K (S1418). The outputted device-color data (8 bits) is printed on a printing medium by the printer engine 806 (S1419). As described above, the transmission rate from the image-data decoding unit 1107 to the RF unit 805 requires three times the transmission rate from the RF unit 805 to the printer engine 806. However, the transmission rate from the compressed-data storing DRAM 1104 to the image-data decoding unit 1107 does not cause a critical problem since data is compressed.

When printing operation of a single color is completed for one page of image data, determination is made as to whether or not the printing process is performed for all of Y, M, C and K colors. If the printing process of any of the colors is not completed, the processing returns to step S1414 to perform the next color printing (S1420).

If the printing process of all colors of Y, M, C and K is completed, the processing of color image output (4 device colors) ends.

Note that in the above described embodiment, descriptions are provided with reference to the flowcharts for a processing procedure where DMA setting is performed once for outputting one device color Y, M, C or K. Since one page of image data is divided in plural bands for performing data compression, garbage collection or the like is necessary in the compressed-data storing DRAM. Moreover, it is sometimes necessary to monitor printing conditions. For this reason, it may be necessary to perform setting for the DMA in the band unit. However in the present specification, in order to simplify the explanation, the descriptions are made for setting the DMA once. The method and conditions thereof are not limited to this.

By the foregoing configuration and processing steps, in the color printer according to the present embodiment, a color image is divided into a band having a predetermined size, then rendering operation is performed in the band unit, and the image data is compressed and stored. The processing steps are repeated until 1 page of image data is stored. Accordingly, a memory for the rendering operation requires a capacity necessary to perform rendering operation of only 1 band. Moreover, since the operated data is compressed to be stored, a memory capacity can be reduced. By virtue of this, conversion maintaining an original tone and resolution can be realized, e.g. at the time of RGB→YMCK conversion.

<Brief Description of Printer Engine Unit>

Figure 18:
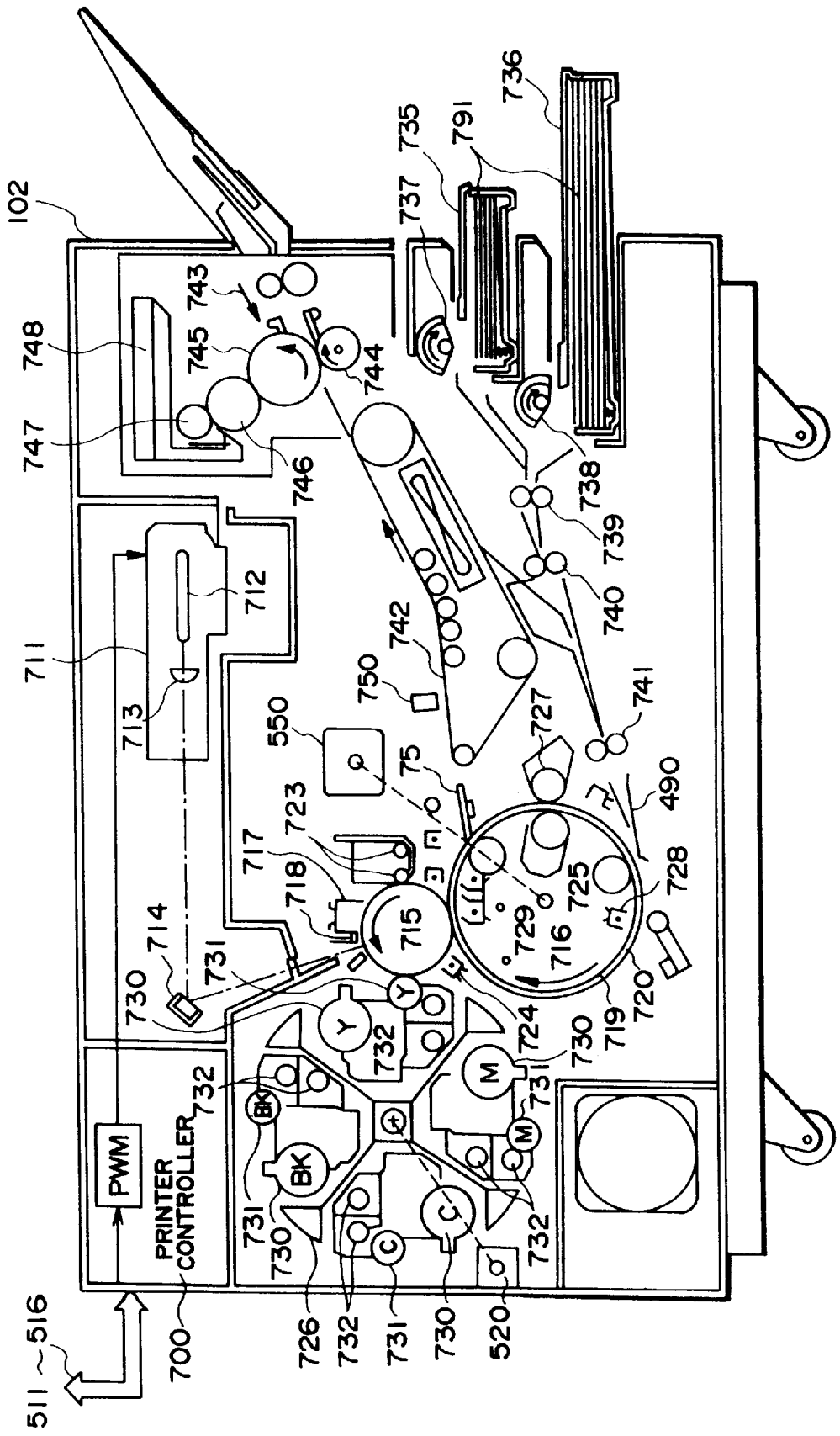
FIG. 18 is a cross-sectional view of a color laser beam printer.

Next, a brief description will be provided for the color printer 102 according to the present embodiment, particularly for the printer engine unit, with reference to FIG. 18. In FIG. 18, a scanner 711 includes a laser output unit (not shown) which transforms image data signals inputted from the RF unit into optical signals, a polygon mirror 712 (e.g., octahedron), a motor (not shown) which rotates the mirror 712, a f/θ lens 713 (image forming lens) and the like. A reflection mirror 714 alters a light path of laser beam. Laser beam irradiated from the laser output unit is reflected on one surface of the polygon mirror 712, passing through the f/θ lens 713 and the mirror 714, to linearly scan (raster scan) the surface of a photosensitive drum 715 rotating in a direction of an arrow as shown in FIG. 18. As a result, an electrostatic latent image corresponding to an original image is formed on the surface of the photosensitive drum 715.

A primary electrostatic charger 717, an entire-surface exposure lamp 718, a cleaning unit 723 which cleans remaining toner which is not transferred, a pre-transfer electrostatic charger 724 are arranged in a peripheral area of the photosensitive drum 715. A developing unit 726 develops the electrostatic latent image formed on the surface of the photosensitive drum 715 by exposing laser beam. Developing sleeves 731Y, 731M, 731C and 731Bk which directly perform development by contacting with the photosensitive drum 715, toner retainers 730Y, 730M, 730C and 730Bk which reserve toner, and a screw 732 which transfers the developing material are arranged in the peripheral area of a rotating axle P of the developing unit. Note that the above-mentioned reference letters Y, M, C and K denote colors. That is, "Y" denotes yellow; "M" magenta; "C" cyan; and "Bk" black. When an yellow toner image is to be formed, the developing process using yellow toner is performed at the position illustrated in FIG. 18. When a magenta toner image is to be formed, the developing unit 726 is rotated on the axle P shown in FIG. 18 so that the developing sleeve 731M in the magenta developing unit contacts with the photosensitive drum 715. The similar operation is performed for developing cyan and black.

A transfer drum 716 transfers the toner image formed on the photosensitive drum 715 on a print sheet. An actuator plate 719 is used for detecting a position of the transfer drum 716 in motion. When the actuator plate 719 reaches close to the position sensor, a position sensor 720 detects that the transfer drum 716 is in a home position. A transfer drum cleaner 725, a print sheet holding roller 727, an electrostatic removing unit 728, a transfer electrostatic charger 729 are arranged along with the actuator plate 719 and the position sensor 720 in the peripheral area of the transfer drum 716.

Meanwhile, print sheet cassettes 735 and 736 store print sheets (cut paper). In the present embodiment, it is assumed that the cassette 735 stores e.g. A4 print sheets, and the cassette 736 stores e.g. A3 print sheets. Print sheet feeding rollers 737 and 738 feed a print sheet from the cassettes 735 or 736. Timing rollers 739, 740 and 741 control timing for feeding and conveying a print sheet. A print sheet conveyed through the foregoing units is lead by a paper guide 749 whereupon an edge of the sheet is held by a gripper which will be described later, and transferred to the transfer drum 716 where image formation is performed. Note that selection of either the cassette 735 or the cassette 736 is determined by an instruction from a main controller 803; and only the selected side of the print sheet feeding roller is rotated.

With the foregoing structure, image data received from the host computer where necessary rendering operation is performed is printed on a printing medium.

The printing apparatus and control method thereof according to the present invention can be applied to a printer other than the above described LBP.

<Configuration of Ink-jet Printer>

Figure 19:
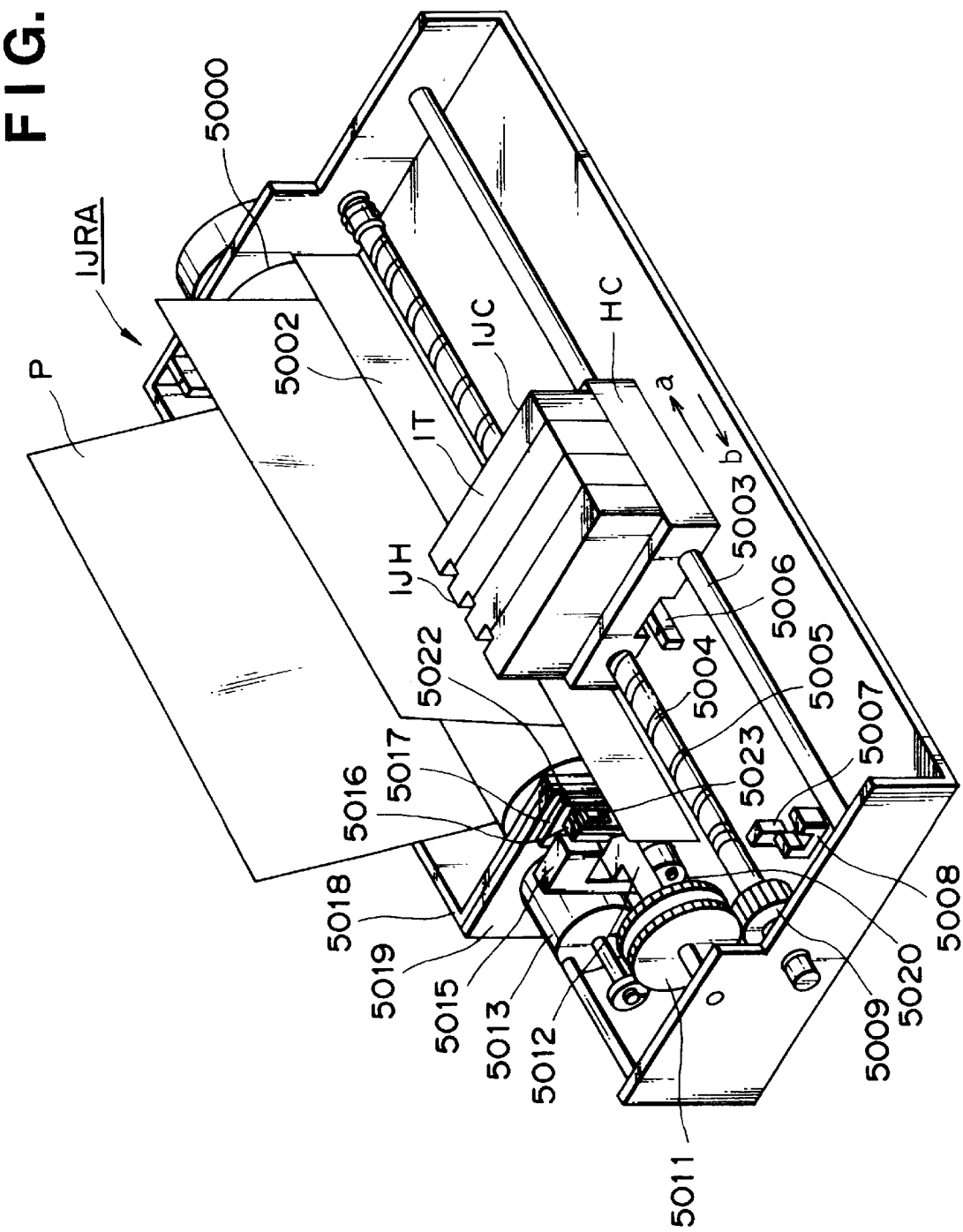
FIG. 19 is a perspective view of a color ink-jet printer.

FIG. 19 shows a color ink-jet printing apparatus IJRA to which the present invention is applicable. A lead screw 5005 rotates via driving-force transmitting gears 5011 and 5009, in synchronization with a rotation and a reversed rotation of a driving motor 5013. A carriage HC comprises a pin (not shown) which engages with a spiral groove 5004 of the lead screw 5005, and reciprocally moves in the directions of arrows a or b. The carriage HC loads an ink-jet cartridge IJC for each of Y (yellow), M (magenta), C (cyan) and Bk (black). A print sheet holding plate 5002 presses a print sheet against a platen 5000 for the area where the carriage reciprocally moves. Photo-couplers 5007 and 5008 serve as home-position detection means, which change a rotation direction of the motor 5013 by detecting a presence of a carriage lever 5006. A supporting portion 5016 supports a cap portion 5022 which caps the front portion of a printhead. A suction portion 5015 is used as means for sucking remaining ink inside the cap, performing suction recovery of the printhead through a cap opening 5023. Reference numeral 5019 denotes a material which enables to move a cleaning blade 5017 in a back-and-forth direction. The material 5019 is supported by a main body supporting plate 5018. The cleaning blade 5017 may not necessarily adopt the form described above, but any well-known cleaning blade may be applied to the present embodiment. A lever 5021 starts the suction recovery operation. The lever 5021 moves along with the movement of a cam 5020 engaging with the carriage, and movement thereof is controlled by well-known transmitting means, e.g. switching a clutch of a driving force of the driving motor or the like.

The present invention is configured such that the above described capping, cleaning, recovery suction operation is performed as necessary at their corresponding positions by the function of the lead screw 5005 when the carriage approaches in a home position area. As long as the necessary operation is performed at a well-known timing, any means is applicable to achieve the above operation.

<Descriptions of Control Structure>

Figure 20:
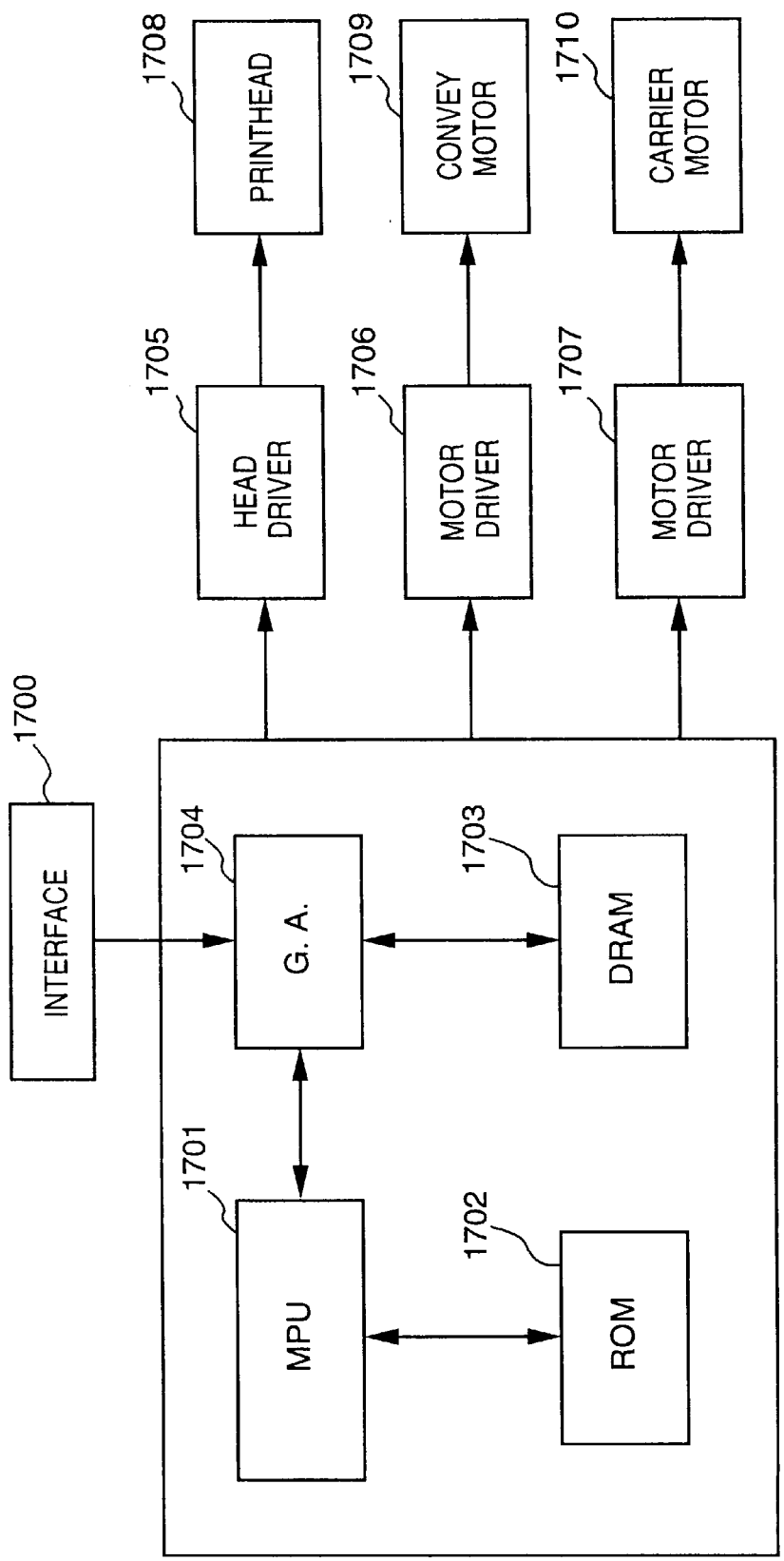
FIG. 20 is a block diagram showing a control structure of the color ink-jet printer.
Figure 21:
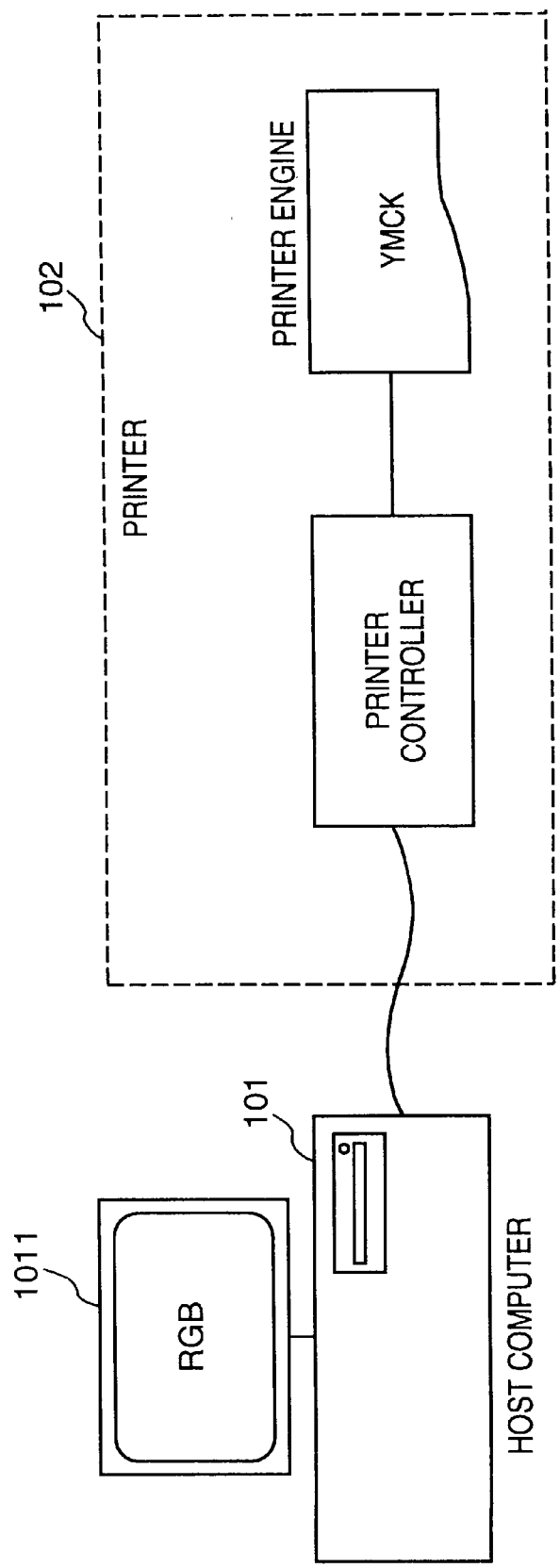
FIG. 21 is a block diagram showing a general structure of a document generation system.
Figure 22A:
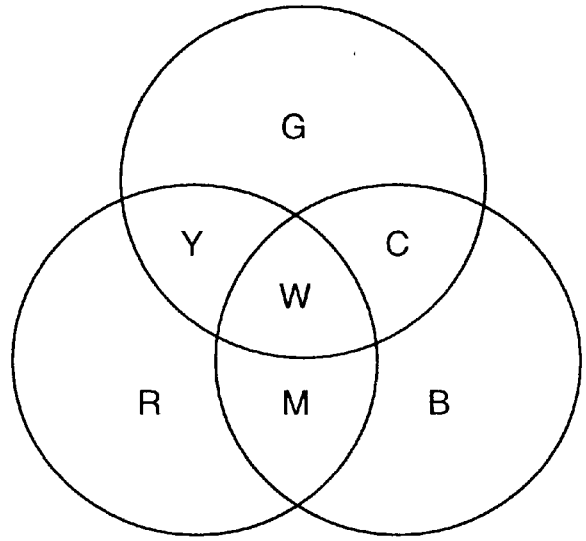
FIGS. 22A and 22B show examples of additive mixture of color stimuli and subtractive mixture of color stimuli used in a CRT display and a printer which performs color printing on a print sheet.
Figure 22B:
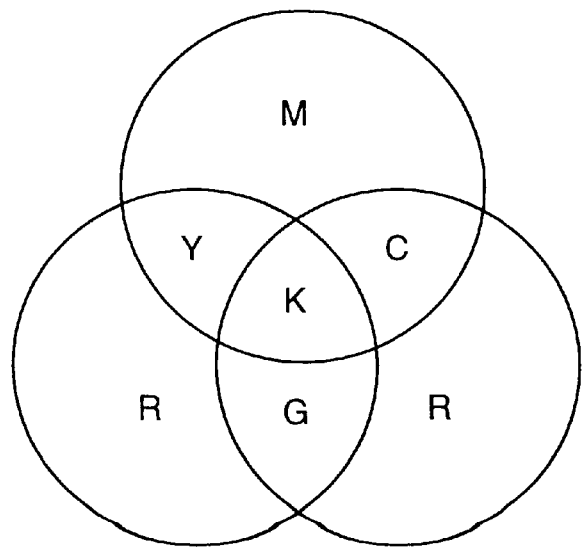
Figure 23A:
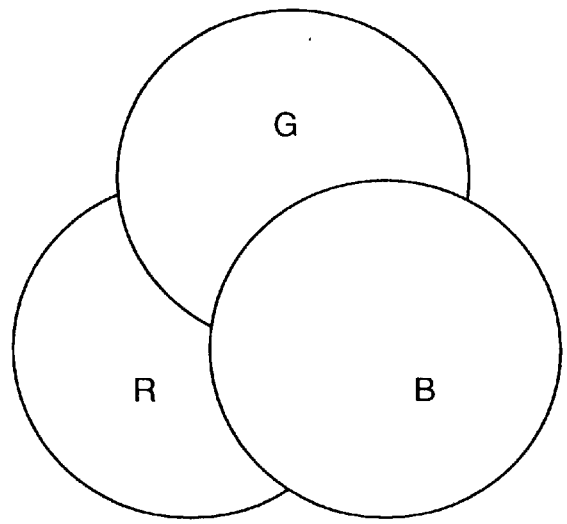
FIGS. 23A and 23B respectively show examples of rendering in a case where rendering operation for calculating overlapped colors is performed and a case where the rendering operation is not performed.
Figure 23B:
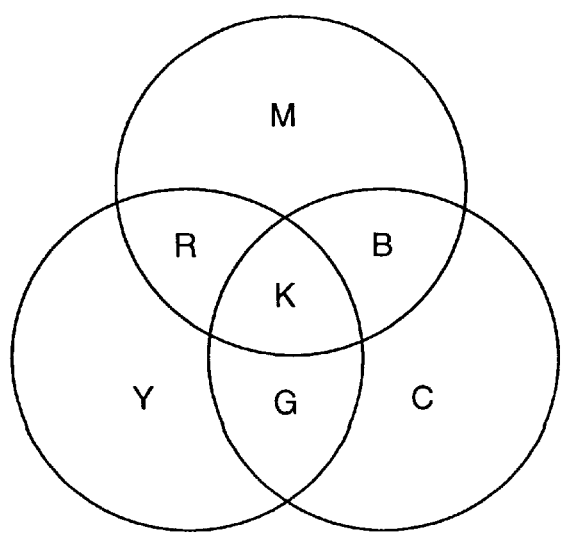

Next, a control structure to perform printing control of the above described apparatus will be described with reference to FIG. 20. In FIG. 20 which shows controlling circuit, a program ROM 1702 stores control program executed by an MPU 1701. A DRAM 1703 is a dynamic-type RAM which stores various data (a recording signal, recording data to be supplied to the head, and the like). A gate array 1704 controls supplying of recording-data to a printhead 1708, and controls data-transfer between an interface 1700, MPU 1701 and RAM 1703. A carrier motor 1710 conveys the printhead 1708. Convey motor 1709 is a motor for conveying a print sheet. A head driver 1705 drives the printhead. Motor drivers 1706 and 1707 drive the convey motor 1709 and the carrier motor 1710 respectively.

Operation of the above described control structure is described. When a recording signal is inputted to the interface 1700, the recording signal is converted to recording data for printing in respective color, between the gate array 1704 and the MPU 1701. Along with the motor drivers 1706 and 1707 being driven, a printhead for the color to be printed is driven in accordance with the recording data sent to the head driver 1705, and printing is performed. The foregoing process is repeated for each of Y, M, C and Bk colors and full-color printing is completed.

The structural components of the present invention can be incorporated into the above described control structure of the ink-jet printer. Accordingly, it is apparent that the present invention is applicable not only to a laser beam printer but also to the above described ink-jet printer or the like.

Furthermore, if it is specified that the width to be printed by one scanning of the printhead is equivalent to one band width, image data on which rendering operation is performed does not have to be compressed, but can be outputted without being compressed; thus, a required memory capacity can be reduced and processing time necessary for compression can be cut down, on account of the ink-jet printer according to the present invention where printing operation in a band unit is possible.

[Second Embodiment]

Figure 13:
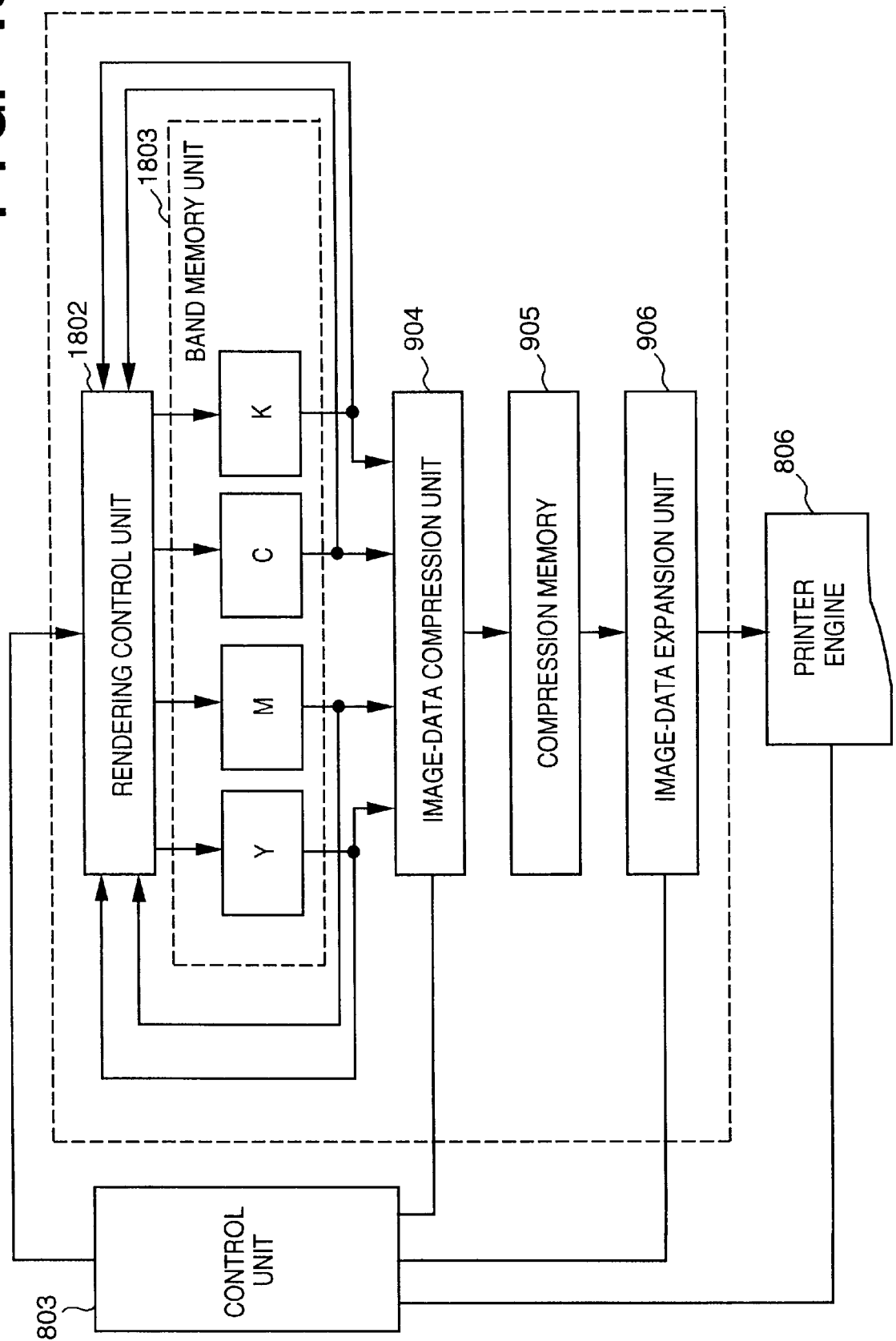
FIG. 13 is a block diagram showing an entire configuration of a printing apparatus according to the second embodiment of the present invention where data processing is performed on Y, M, C and K data.
Figure 14:
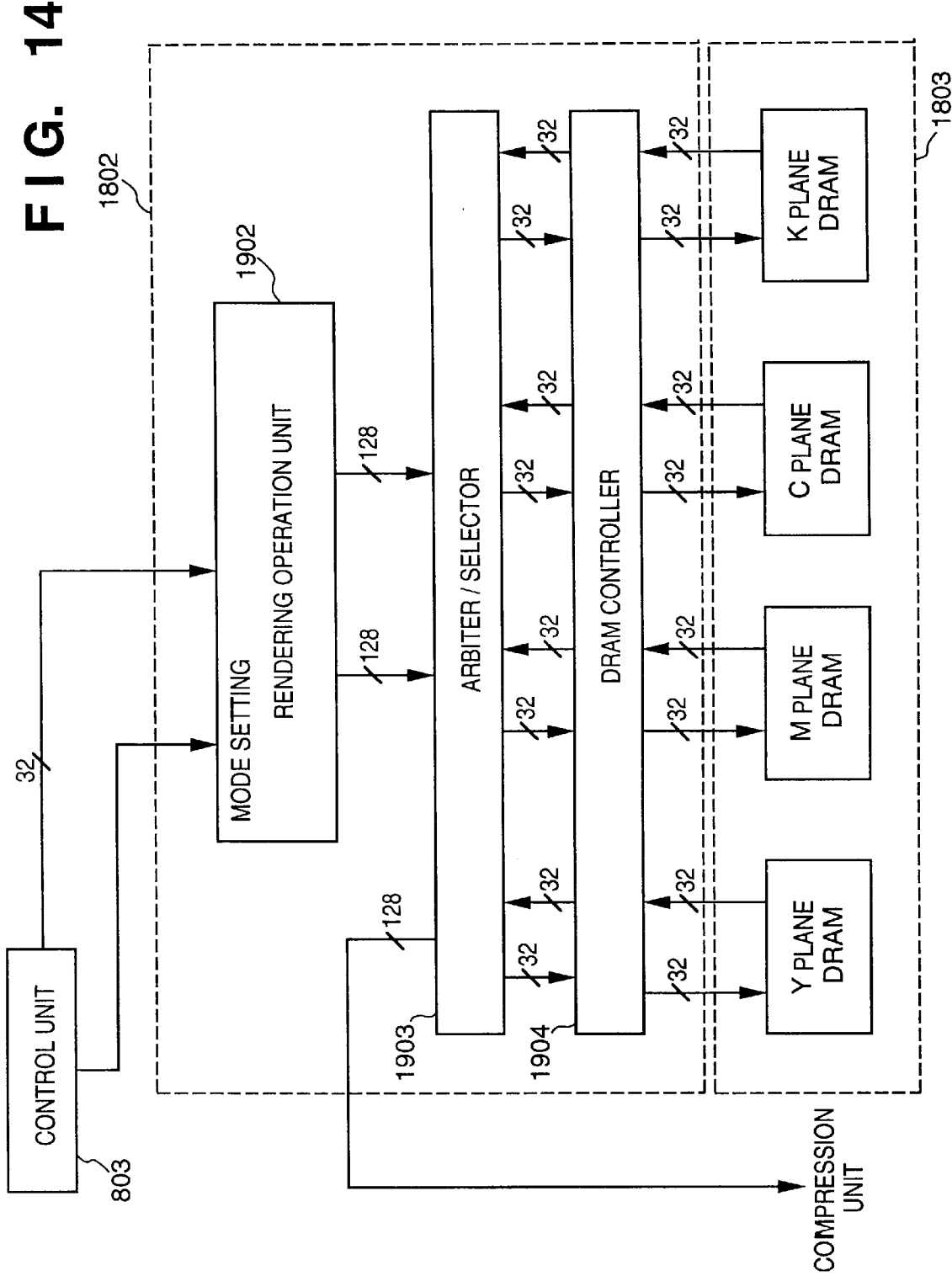
FIG. 14 is a block diagram showing a structural relationship between the band memory and the rendering operation unit according to the second embodiment where data processing is performed on Y, M, C and K data.
Figure 15:
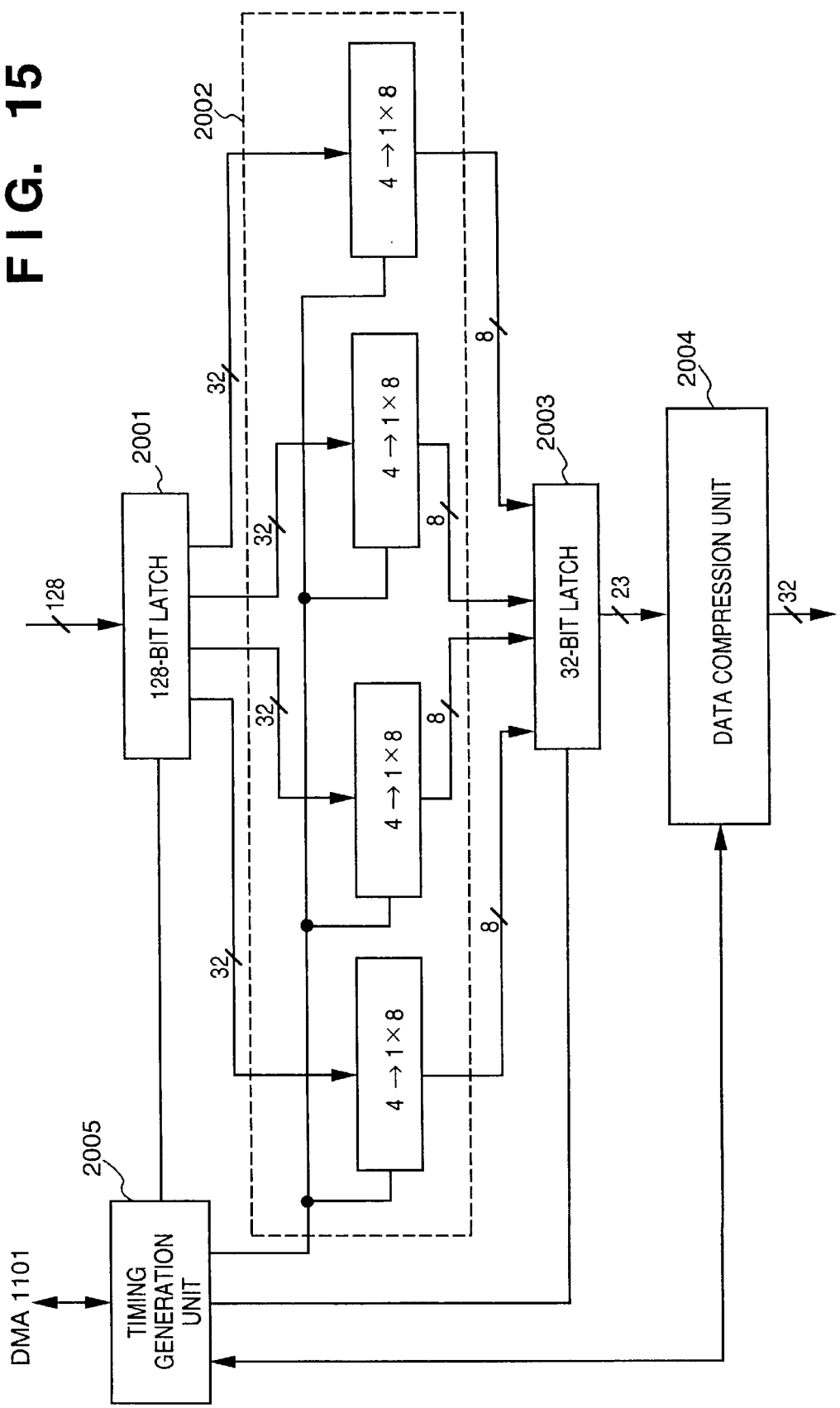
FIG. 15 is a block diagram showing the data compression unit according to the second embodiment where data processing is performed on Y, M, C and K data.

In the first embodiment, descriptions have been provided for the system which processes R, G and B data to perform rendering operation. However, the present invention is not limited to the above. For instance, if, for some reason, a system for processing Y, M, C and K data is to be constructed, the structure shown in FIG. 2 is substituted with the structure shown in FIG. 13, the structure shown in FIG. 3 is substituted with the structure shown in FIG. 14, and the structure shown in FIG. 5 is substituted with the structure shown in FIG. 15. In addition, if a bus from a band memory 1803 in FIG. 13 has 128 bits (32×4), a system equivalent to the first embodiment can be constructed. The foregoing substitution is to perform processing on Y, M, C and K image data instead of R, G and B image data; thus the plane memories are increased from three colors to four colors. Since conversion from R, G and B data to Y, M, C and K data is well known, if an operation on R, G and B data for, e.g. mixing colors or the like, is specified, an operation procedure after the conversion into Y, M, C and K data is automatically determined on the basis of the specified operation and the conversion procedure. Note that in this case, the processing by the RF prior to the printer engine is not necessary.

[Third Embodiment]

In the first embodiment, the plane memories 9031, 9032 and 9033 each having a respective color in the band memory 903, are independently structured as a bank (a separate memory module), and an access to these memory modules are performed simultaneously in order to increase processing speed. However, the present invention is not limited to the above. It may also be structured by a single memory module, in order to reduce manufacturing cost.

Figure 16:
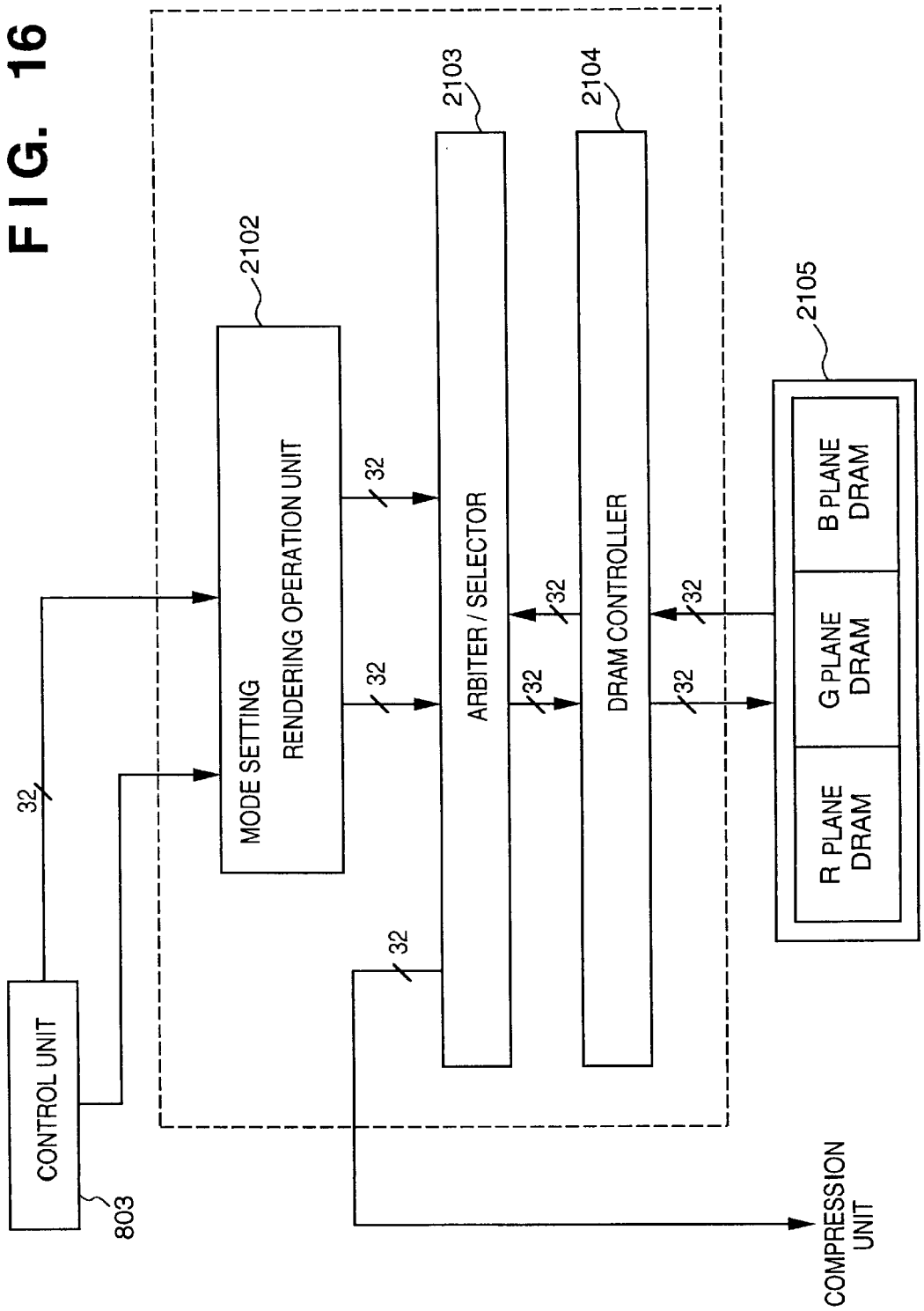
FIG. 16 is a block diagram showing a structural relationship between the band memory and the rendering operation unit according to the third embodiment of the present invention where a transmission rate through a bus is decreased to 32 bits.
Figure 17:
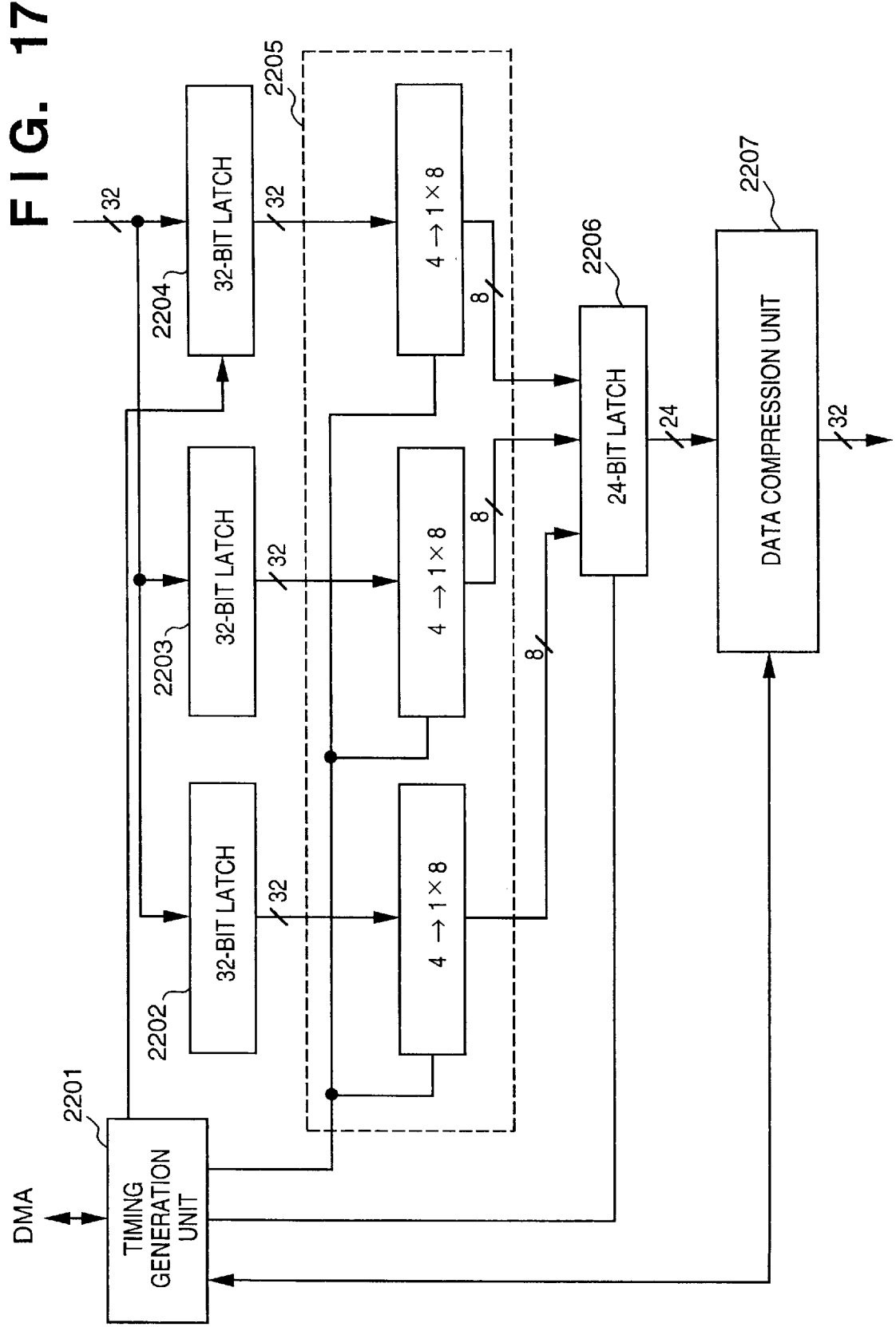
FIG. 17 is a block diagram showing the data compression unit according to the third and fourth embodiments of the present invention where a transmission rate through a bus is decreased to 32 bits.

FIGS. 16 and 17 are block diagrams showing the case where the band memories of the first embodiment shown in FIGS. 3 and 5 are structured as one memory module having 32-bit bus. In the case where the band memory is structured with 32-bit bus, processing thereof is different from steps S1407–S1408 in the flowchart of FIG. 7 explained in the first embodiment. Hereinafter, the operation of a rendering operation unit 2102 in FIG. 16 is described.

In the first embodiment, 96-bit data, i.e. 8-bit data×4 pixels for three color planes, is read by one access to the band memories 9031, 9032 and 9033. Rendering operation is performed utilizing the read 96-bit data and 32-bit data written by the control unit 803, and 96-bit data (i.e. data for 4 pixels) which is obtained as a result of the rendering operation, is stored in the band memories 9031, 9032 and 9033 in accordance with R, G and B. Moreover, the burst cycle is utilized in order to increase processing speed.

In the third embodiment, when 32-bit bus data is to be compressed, the 32-bit data is read at once from one of the planes in the band memory 2105 at the time of rendering operation, and this read cycle is repeated for all three planes. The read 3-word data (32 bits×3 colors) is read by the rendering operation unit 2102, and the data and outputting data is temporarily stored in latches 2202–2204 in FIG. 17. Then, the rendering operation similar to that described in the first embodiment is performed, and the 96-bit data which is a result of the rendering operation is written in the band memory in a write cycle of writing 32-bit data repeated for three times. Accordingly, the memory cycle at this stage is not the above described read-modify-write cycle in the first embodiment, but is a 3-word-read cycle followed by a 3-word-write cycle. Because of this, the manufacturing cost can be reduced; however because of the extended time for the total cycle, processing time becomes long.

In order to realize the above described write cycle repeated for three times in the 32-bit bus structure, the DMA control unit 1101 shown in FIG. 4 is configured for three channels. The DMA control unit 1101 is configured such that data is transferred to each channel, with each of R, G and B plane-data storing locations in a band memory 2105 as a source, and a next cycle is generated after each of the channels completes one access.

An access cycle to the memory is optimized in accordance with the structure of the bus (manufacturing cost), performance of data transfer, or the like; thus it is not limited to the above described embodiment.

Even in the 32-bit bus structure, processing is also possible for Y, M, C and K data.

[Fourth Embodiment]

Similar to the above described case, if manufacturing cost needs to be reduced, the 96-bit bus from the band memory to the coding unit 1103 shown in FIG. 4 may be reduced to 32 bits. As an example, the image-data coding unit 1103 shown in FIG. 4 may be configured as that shown in FIG. 17. The memory cycle in this case will be described below.

When compression processing is started, each of R, G and B plane data each having 8 bits in the band memory is accessed in three write cycles, and latched respectively in 32-bit latches 2202–2204. Herein, 32 bits of R data (4 pixels of R data) is latched in the 32-bit latch 2202; 32 bits of G data (4 pixels of G data) in the 32-bit latch 2203; and 32 bits of B data (4 pixels of B data) in the 32-bit latch 2204.

The R, G and B data corresponding to 4 pixels latched in the three 32-bit latches is sent to the data compression unit in a unit of 24 bits of R, G and B data corresponding to one pixel, as similar to the process illustrated in the time chart in FIG. 10. This process is also applicable to a case of Y, M, C and K data by adding another 32-bit latch, and executing the read cycle from the band memory in a unit of 4 cycles.

[Other Embodiments]

Furthermore the first embodiment provides the description to start rendering operation after rendering-instruction data corresponding to one page is stored in the reception buffer 802, for the purpose of easy band control. However, the present invention is not limited to this. As long as the rendering processing for one band data is performed smoothly, band rendering process can be performed while rendering-instruction data is received.

Moreover, in the first embodiment, image data is generated by the control unit 803 which controls the entire apparatus, more specifically, a CPU or the like. However image data generation is not limited to this example. Image data generated by the control unit 803 may be generated by a hardware rasterizer or the like.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. A printing apparatus for receiving color print data representing an image object in a page description language from a host unit and outputting a color image on the basis of the color print data, comprising:

mode-designation means for designating a mode by interpreting the color print data received from the host unit;

generation means for generating color image data from the color print data and dividing the color image data into color component data;

storage means for storing the color component data in a band unit, wherein one page of an original image is divided into bands each having a predetermined size;

operation means for, when the image data is generated by said generation means, performing logical operation processing in band units on the color component data stored by said storage means and the color image data generated by said generation means to produce a color image, in accordance with an operation procedure corresponding to the mode; and output means for outputting the color image produced by said operation means.

2. The printing apparatus according to claim 1, further comprising:

compression means for compressing the color image data in the band unit operated by said operation means;

compressed-data storage means for storing the data compressed by said compression means which corresponds to one page of the original image; and expansion means for expanding the compressed data stored by said compressed-data storage means, wherein said output means outputs a color image expanded by said expansion means.

3. The printing apparatus according to claim 1, wherein said mode-designation means designates at least either a mode where one color is overwritten by another color, or a mode where one color and another color are mixed together.

4. The printing apparatus according to claim 1, wherein the color print data received from the host unit is R, G and B image data, and said printing apparatus further comprises color conversion means for converting R, G and B image data to Y, M, C and K image data.

5. The printing apparatus according to claim 1, wherein said storage means performs memory read or write operation for each of the stored color component data simultaneously.

6. The printing apparatus according to claim 1, wherein said storage means performs memory read and write operation for each of the stored color component data in a sequence of color components.

7. The printing apparatus according to claim 1, wherein the color print data is Y, M, C and K image data.

8. A color printing apparatus comprising:

an interface for receiving print data from a print-data generation source such as a host computer or the like;

image generation means for generating image data by analyzing the print data received by said interface;

a memory for temporarily storing the image data generated by said image generation means;

operation means for performing rendering operation on the image data stored in said memory and the image data generated by said image generation means;

compression means for compressing the image data stored in said memory;

a second memory for storing the data compressed by said compression means for at least one page of an original image;

expansion means for expanding the compressed data stored in the second memory;

a printer engine for printing the image data expanded by said expansion means on a printing medium; and control means for controlling each of the aforementioned means, wherein image data is generated by said image generation means in a unit of a band where one page of an original image is divided into areas of a predetermined size, rendering operation is performed by said operation means on the image data to render the image data in the band unit, and the band image data is compressed by said compression means, said image data generation, said rendering operation and said compression processing being repeated until compressed data corresponding to one page of the original image is stored, and each of said means being synchronously operated; and wherein said printer engine is started when the data corresponding to one page of the original image is stored in said second memory, the compressed data is expanded by said expansion means in real-time in synchronization with a printing speed, resulting in an image being outputted by said printer engine.

9. A printing control method, utilizing a band storage which stores color image data in a band unit, for receiving color print data representing an image object in a page description language from a host unit and outputting a color image on the basis of the color print image, comprising the steps of:

designating a mode by interpreting the color print data received from the host unit;

generating color image data from the color print data and dividing the color image data into color component data;

performing logical operation processing in band units on the color component data stored in the band storage and the color image data generated in said generating step to produce a color image, in accordance with an operation procedure corresponding to the mode, and storing the result of the operation in the band storage; and outputting the color image produced in said operating step.

10. The printing control method according to claim 9, further comprising the steps of:

compressing the color image data stored in said band storage and storing the data in a compressed-data storage during said operating step and said outputting step;

controlling repetition of said generating step to said compressing step performed in said compressing step, until compressed image data corresponding to one page of an original image is stored; and expanding the compressed image data to an image when the compressed image data corresponding to one page is stored.

11. The printing control method according to claim 9, wherein in said designating step of designating a mode, at least either a mode where one color is overwritten by another color, or a mode where one color and another color are mixed together, is designated.

12. The printing control method according to claim 9, wherein the color print data received from the host unit is R, G and B image data, and said printing control method further comprises a step of converting R, G and B image data to Y, M, C and K image data before said outputting step.

13. The printing control method according to claim 9, wherein in said operating step, memory read or write operation for each color component data from/to said band storage is performed simultaneously.

14. The printing control method according to claim 9, wherein in said operating step, memory read and write operation for each color component data from/to said band storage is performed in a sequence of color components.

15. The printing control method according to claim 9, wherein the color print data received from the host unit is Y, M, C and K image data.

16. A printing control method for controlling a color printing apparatus which includes:

an interface for receiving print data from a print-data generation source such as a host computer or the like;

image generation means for generating image data by analyzing the print data received by said interface;

a memory for temporarily storing the image data generated by said image generation means;

operation means for performing rendering operation on the image data stored in said memory and the image data generated by said image generation means;

compression means for compressing the image data stored in said memory;

a second memory for storing the data compressed by said compression means for at least one page of an original image;

expansion means for expanding the compressed data stored in the second memory;

a printer engine for printing the image data expanded by said expansion means on a printing medium; and control means for controlling each of the aforementioned means, said printing control method comprising the steps of:

generating image data by said image generation means in a unit of a band where one page of an original image is divided into areas of a predetermined size, performing rendering operation by said operation means on the image data to render the image data in the band unit, and compressing the band image data by said compression means, said image data generation step, said rendering operation step and said compression processing step being repeated until compressed data corresponding to one page of the original image is stored, and each of said means being synchronously operated; and wherein said printer engine is started when the data corresponding to one page of the original image is stored in said second memory, the compressed data is expanded by said expansion means in real-time in synchronization with a printing speed, resulting in an image being outputted by said printer engine.

17. A computer program product comprising a computer readable medium having computer program codes, for receiving color print data representing an image object in a page description language from a host unit and outputting a color image by utilizing a band storage which stores color image data in a band unit, said program including the steps of:

generating color image data from the color print data and dividing the color image data into color component data;

designating a mode by interpreting the color print data received from the host unit;

performing logical operation processing in band units on the color component data stored in the storage and the color image data generated in said generating step to produce a color image, in accordance with an operation procedure corresponding to the mode, and storing the result of the operation in the storage; and outputting the color image produced in said operating step.

18. The computer program product according to claim 17, further comprising the steps of:

compressing the color image data stored in said band storage and storing the data in a compressed-data storage during said operating step and said outputting step;

controlling repetition of said generating step to said compressing step performed in said compressing step, until compressed image data corresponding to one page of an original image is stored; and expanding the compressed image data to an image when the compressed image data corresponding to one page is stored.

19. The computer program product according to claim 17, wherein in said designating step of designating a mode, at least either a mode where one color is overwritten by another color, or a mode where one color and another color are mixed together, is designated.

20. The computer program product according to claim 17, wherein the color print data received in said receiving step is R, G and B image data, and said printing control method further comprises a step of converting R, G and B image data to Y, M, C and K image data before said outputting step.

21. The computer program product according to claim 17, wherein in said operating step, memory read or write operation for each color component data from/to said band storage is performed simultaneously.

22. The computer program product according to claim 17, wherein in said operating step, memory read and write operation for each color component data from/to said band storage is performed in a sequence of color components.

23. The computer program product according to claim 17, wherein the color print data received from the host unit is Y, M, C and K image data.

24. A computer program product comprising a computer readable medium having computer program codes to be executed by a computer, said computer including:

an interface for receiving print data from a print-data generation source such as a host computer or the like;

image generation means for generating image data by analyzing the print data received by said interface;

a memory for temporarily storing the image data generated by said image generation means;

operation means for performing rendering operation on the image data stored in said memory and the image data generated by said image generation means;

compression means for compressing the image data stored in said memory;

a second memory for storing the data compressed by said compression means for at least one page of an original image;

expansion means for expanding the compressed data stored in the second memory;

a printer engine for printing the image data expanded by said expansion means on a printing medium; and control means for controlling each of the aforementioned means, said printing control method comprising the steps of:

generating image data by said image generation means in a unit of a band where one page of an original image is divided into areas of a predetermined size, performing rendering operation by said operation means on the image data to render the image data in the band unit, and compressing the band image data by said compression means, said image data generation step, said rendering operation step and said compression processing step being repeated until compressed data corresponding to one page of the original image is stored, and each of said means being synchronously operated; and wherein said printer engine is started when the data corresponding to one page of the original image is stored in said second memory, the compressed data is expanded by said expansion means in real-time in synchronization with a printing speed, resulting in an image being outputted by said printer engine.

25. A printing system having a computer and a printer, said printer including:

reception means for receiving color print data from the computer;

mode-designation means for designating a mode by interpreting the color print data received by said reception means;

generation means for generating color image data from the color print data and dividing the color image data into color component data;

storage means for storing the color component data in band units, where one page of an original image is divided into bands of a predetermined size;

operation means for, when the image data generated by said generation means is stored in said storage means, performing logical operation processing in band units on the color component data stored by said storage means and the color image data generated by said generation means to produce a color image, in accordance with an operation procedure corresponding to the mode; and output means for outputting the color image produced by said operation means, wherein said computer includes transmission means for transmitting color print data to the printer.

26. The printing system according to claim 25, further comprising:

compression means for compressing the color image data in the band unit operated by said operation means;

compressed-data storage means for storing the data compressed by said compression means which corresponds to one page of the original image; and expansion means for expanding the compressed data stored by said compressed-data storage means, wherein said output means outputs a color image expanded by said expansion means.

27. The printing system according to claim 25, wherein said mode-designation means designates at least either a mode where one color is overwritten by another color, or a mode where one color and another color are mixed together.

28. The printing system according to claim 25, wherein the color print data received by said reception means is R, G and B image data, and said printing apparatus further comprises color conversion means for converting R, G and B image data to Y, M, C and K image data.

29. The printing system according to claim 25, wherein said storage means performs memory read or write operation for each of the stored color component data simultaneously.

30. The printing system according to claim 25, wherein said storage means performs memory read and write operation for each of the stored color component data in a sequence of color components.

31. The printing system according to claim 25, wherein the color print data received by said reception means is Y, M, C and K image data.

32. A printing system having a computer and a printer, said computer including transmission means for transmitting print data; and said printer including:

an interface for receiving print data from a print-data generation source such as a host computer or the like;

image generation means for generating image data by analyzing the print data received by said interface;

a memory for temporarily storing the image data generated by said image generation means;

operation means for performing rendering operation on the image data stored in said memory and the image data generated by said image generation means;

compression means for compressing the image data stored in said memory;

a second memory for storing the data compressed by said compression means for at least one page of an original image;

expansion means for expanding the compressed data stored in the second memory;

a printer engine for printing the image data expanded by said expansion means on a printing medium; and control means for controlling each of the aforementioned means, wherein image data is generated by said image generation means in a unit of a band where one page of an original image is divided into areas of a predetermined size, rendering operation is performed by said operation means on the image data to render the image data in the band unit, and the band image data is compressed by said compression means, said image data generation, said rendering operation and said compression processing being repeated until compressed data corresponding to one page of the original image is stored, and each of said means being synchronously operated; and wherein said printer engine is started when the data corresponding to one page of the original image is stored in said second memory, the compressed data is expanded by said expansion means in real-time in synchronization with a printing speed, resulting in an image being outputted by said printer engine.

33. A printing apparatus for receiving color print data representing an image object in a page description language from a host unit and outputting a color image on the basis of the color print data, comprising:

conversion means for converting the color print data into color image data in a RGB format and dividing the color image data into color component data;

storage means for storing the color component data generated by said conversion means in band units, wherein one page of an original image is divided into bands each having a predetermined size;

operation means for performing logical operation processing in band units, on the color component data stored by said storage means and the color image data generated by said conversion means to produce color image data; and color conversion means for converting the color image data produced by said operation means into a color image data in a device color format.

34. The printing apparatus according to claim 33, further comprising:

compression means for compressing the color image data in band units produced by said operation means;

compressed-data storage means for storing the data compressed by said compression means which corresponds to one page of the original image;

expansion means for expanding the compressed data stored by said compressed-data storage means; and output means for outputting a color image expanded by said expansion means.

35. The printing apparatus according to claim 33, further comprising designation means for designating at least either a mode where one color is overwritten by another color, or a mode where on color and another color are mixed together, wherein said operation means performs operation processing in accordance with the designated mode.

36. The printing apparatus according to claim 33, wherein said storage means performs memory read or write operations for each of the stored component data simultaneously.

37. The printing apparatus according to claim 33, wherein said storage means performs memory read and write operations for each of the stored color component data in a sequence of color components.

38. The printing apparatus according to claim 34, wherein the logical operation is performed on the image data generated in band units by said operation means, compression by said compression means is repeated until the compression for the image data corresponding to one page is completed, a printing engine is started when the image data corresponding to one page is stored in said compressed-data storage means, and the compressed image data is expanded and outputted by said expansion means in synchronism with the printing engine.

39. A printing method for receiving color print data representing an image object in a page description language and outputting a color image on the basis of the color print data, comprising the steps of:

converting the color print data into color image data in a RGB format and dividing the color image data into color component data;

storing the color component data generated in said converting step in band units into a storage, wherein one page of an original image is divided into bands each having a predetermined size;

performing logical operation processing in band units on the color component data stored in the storage and the color image data generated in said converting step to produce color image data; and converting the color image data produced in said operating step into a color image data in a device color format.

40. The printing method according to claim 39, further comprising the steps of:

compressing the color image data in band units produced in said operating step;

storing the data compressed in said compressing step which corresponds to one page of the original image in a compressed-data storage;

expanding the compressed data stored in the compressed-data storage; and outputting a color image expanded in said expanding step.

41. The printing method according to claim 39, further comprising a step of designating at least either a mode where one color is overwritten by another color, or a mode where one color and another color are mixed together, wherein operation processing is performed in said operating step in accordance with the designated mode.

42. The printing method according to claim 39, wherein said storing step performs memory read or write operations for each of the stored color component data simultaneously.

43. The printing method according to claim 39, wherein said storing step performs memory read and write operations for each of the stored color component data in a sequence of color components.

44. The printing method according to claim 40, wherein the logical operation is performed on the image data produced in band units in said operating step, compression in said compressing step is repeated until the compression for the image data corresponding to one page is completed, a printing engine is started when the image data corresponding to one page is stored in said compressed-data storage, and the compressed image data is expanded and outputted in said expanding step in synchronism with the printing engine.

45. A computer program product comprising a computer readable medium having computer program codes, for receiving color print data representing an image object in a page description language and outputting a color image on the basis of the color print data, said program including the steps of:

converting the color print data into color image data in a RGB format and dividing the color image data into color component data;

storing the color component data generated in said converting step in band units into a storage, wherein one page of an original image is divided into bands each having a predetermined size;

performing logical operation processing in band units on the color component data stored in the storage and the color image data generated in said converting step to produce color image data; and converting the color image data produced in said operating step into a color image data in a device color format.

46. The computer program product according to claim 45, further comprising the steps of:

compressing the color image data in band units produced in said operating step;

storing the data compressed in said compressing step which corresponds to one page of the original image in a compressed-data storage;

expanding the compressed data stored in the compressed-data storage; and outputting a color image expanded in said expanding step.

47. The computer program product according to claim 45, further comprising a step of designating at least either a mode where one color is overwritten by another color, or a mode where one color and another color are mixed together, wherein operation processing is performed in said operating step in accordance with the designated mode.

48. The computer program product according to claim 45, wherein said storing step performs memory read or write operations for each of the stored color component data simultaneously.

49. The computer program product according to claim 45, wherein said storing step performs memory read and write operations for each of the stored color component data in a sequence of color components.

50. The computer program product according to claim 46, wherein the logical operation is performed on the image data in band units produced in said operating step, compression in said compressing step is repeated until the compression for the image data corresponding to one page is completed, a printing engine is started when the image data corresponding to one page is stored in said compressed-data storage, and the compressed image data is expanded and outputted in said expanding step in synchronism with the printing engine.

* * * * *

UNITED STATES PATENT AND TRADEMARK OFFICE
CERTIFICATE OF CORRECTION

PATENT NO. : 5,978,553

DATED : November 2, 1999

INVENTOR(S) : Jun Ikeda

It is certified that error appears in the above-identified patent and that said Letters Patent is hereby corrected as shown below:

COLUMN 8:

Line 2, "a" should read --the--.

COLUMN 15:

Line 25, "an" should read --a--.

COLUMN 25:

Line 55, "on" should read --one--.

Signed and Sealed this

First Day of August, 2000

Attest:

Q. TODD DICKINSON

Attesting Officer

Director of Patents and Trademarks